(12) United States Patent
Miyajima et al.

(10) Patent No.: US 12,129,564 B2
(45) Date of Patent: Oct. 29, 2024

(54) HYDROGEN PRODUCTION APPARATUS

(71) Applicant: HONDA MOTOR CO., LTD., Tokyo (JP)

(72) Inventors: Kazuyoshi Miyajima, Wako (JP); Takashi Fukuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 458 days.

(21) Appl. No.: 17/582,384

(22) Filed: Jan. 24, 2022

(65) Prior Publication Data
US 2022/0235473 A1    Jul. 28, 2022

(30) Foreign Application Priority Data

Jan. 25, 2021    (JP) .................................. 2021-009862

(51) Int. Cl.
| | | |
|---|---|---|
| *C25B 9/01* | (2021.01) | |
| *C25B 1/04* | (2021.01) | |
| *C25B 9/00* | (2021.01) | |
| *E05B 17/00* | (2006.01) | |
| *E05B 65/10* | (2006.01) | |
| *E05C 9/04* | (2006.01) | |

(52) U.S. Cl.
CPC ................. *C25B 9/01* (2021.01); *C25B 1/04* (2013.01); *C25B 9/00* (2013.01); *E05B 17/0062* (2013.01); *E05B 65/102* (2013.01); *E05B 65/1026* (2013.01); *E05C 9/04* (2013.01)

(58) Field of Classification Search
CPC ............ E05B 65/1026; E05B 17/0062; E05C 9/04–9/048; C25B 1/04
See application file for complete search history.

(56) References Cited

U.S. PATENT DOCUMENTS

| | | | |
|---|---|---|---|
| 5,116,089 A  * | 5/1992 | Taylor ................... | E05B 65/102 |
| | | | 292/229 |
| 5,375,894 A | 12/1994 | Schlack | |
| 6,223,473 B1 | 5/2001 | Romig | |

(Continued)

FOREIGN PATENT DOCUMENTS

| | | |
|---|---|---|
| CN | 108872456 A | 11/2018 |
| CN | 111394744 A | 7/2020 |

(Continued)

OTHER PUBLICATIONS

Office Action dated Jul. 11, 2023 issued in the corresponding Chinese Patent Application No. 202210088951.3 with the English machine translation thereof.

(Continued)

*Primary Examiner* — Harry D Wilkins, III
(74) *Attorney, Agent, or Firm* — Carrier, Shende & Associates P.C.; Joseph P. Carrier; Fulchand P. Shende

(57) ABSTRACT

In a hydrogen production apparatus, a front end of a housing is closed by an opening/closing door. In a closed state of the opening/closing door, the upper end of the upper rod and the lower end of the lower rod in the opening/closing switching mechanism are disposed behind the first front frame piece and the second front frame piece of the housing, respectively. The axial distance between the upper end of the lower collar member and the second stopper is greater than the axial distance between the upper end of the upper collar member and the first stopper.

9 Claims, 13 Drawing Sheets

(56) References Cited

U.S. PATENT DOCUMENTS

| | | | | |
|---|---|---|---|---|
| 8,361,304 | B2* | 1/2013 | Yoshida | C25B 15/08 |
| | | | | 204/266 |
| 2005/0121315 | A1* | 6/2005 | Baltrucki | H01M 8/04671 |
| | | | | 204/228.4 |
| 2008/0310106 | A1* | 12/2008 | Sabharwal | F24F 5/0021 |
| | | | | 454/339 |
| 2014/0008358 | A1 | 1/2014 | Fingerhut et al. | |
| 2016/0068976 | A1* | 3/2016 | Yoshida | C25B 9/73 |
| | | | | 204/265 |
| 2019/0234348 | A1* | 8/2019 | Johnson | F01P 3/20 |
| 2019/0376196 | A1* | 12/2019 | Mohri | C25B 15/02 |
| 2020/0010961 | A1 | 1/2020 | Kazuno et al. | |
| 2021/0156038 | A1* | 5/2021 | Ballantine | C25B 1/50 |
| 2023/0265833 | A1* | 8/2023 | Soerensen | C25B 9/60 |
| | | | | 290/55 |

FOREIGN PATENT DOCUMENTS

| | | | |
|---|---|---|---|
| CN | 111501058 A | | 8/2020 |
| DE | 202023101981 U1 * | 6/2023 | E05B 65/1026 |
| GB | 222284 A | | 10/1924 |
| JP | S50-020278 Y | | 6/1975 |
| JP | S54-144132 U | | 10/1979 |
| JP | S56-52407 U | | 5/1981 |
| JP | H08-191511 A | | 7/1996 |
| JP | H09-028006 A | | 1/1997 |
| JP | 2016-135978 A | | 7/2016 |
| JP | 2018-194300 A | | 12/2018 |
| JP | 2020-007592 A | | 1/2020 |
| TW | 201901012 A | | 1/2019 |

OTHER PUBLICATIONS

Office Action dated Jul. 2, 2024 issued in the corresponding Japanese Patent Application No. 2021-009862 with the English machine translation thereof.

* cited by examiner

FIG. 6A
FIG. 6B
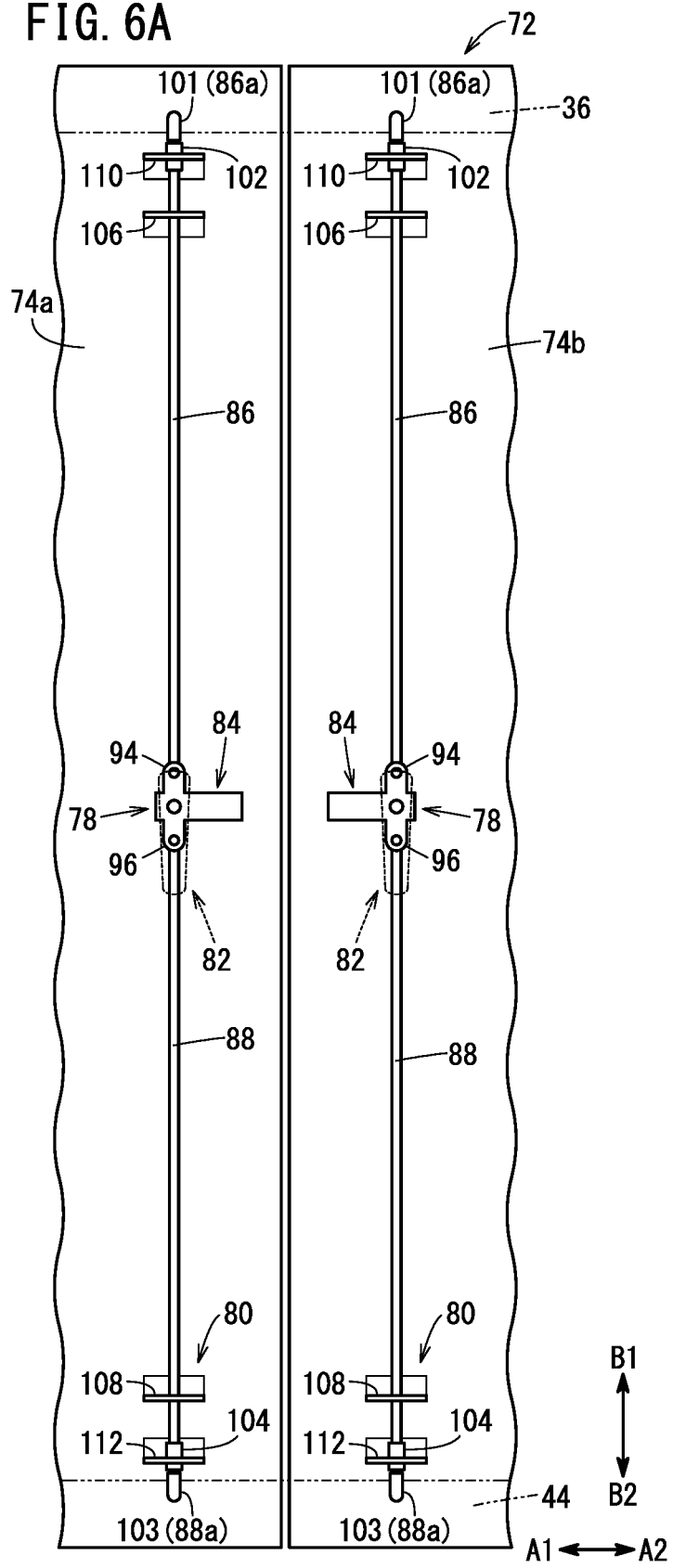
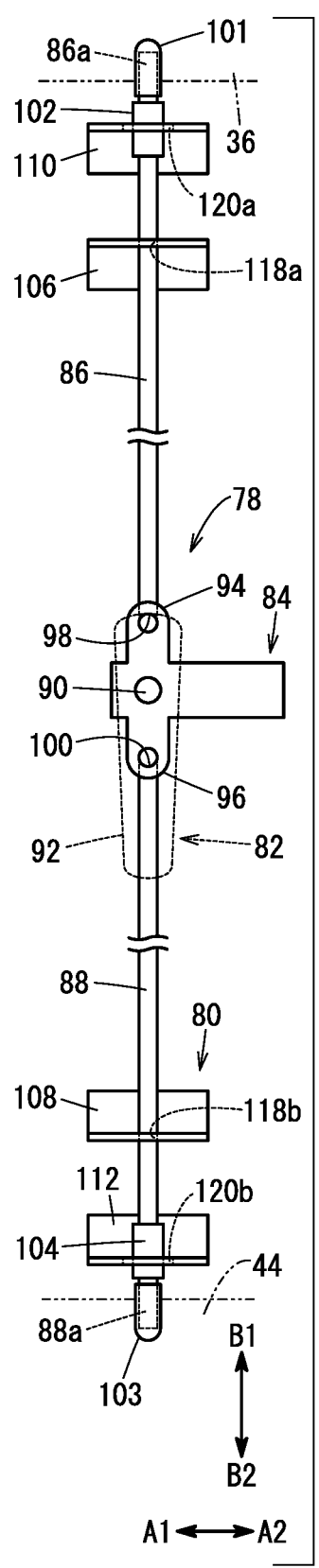

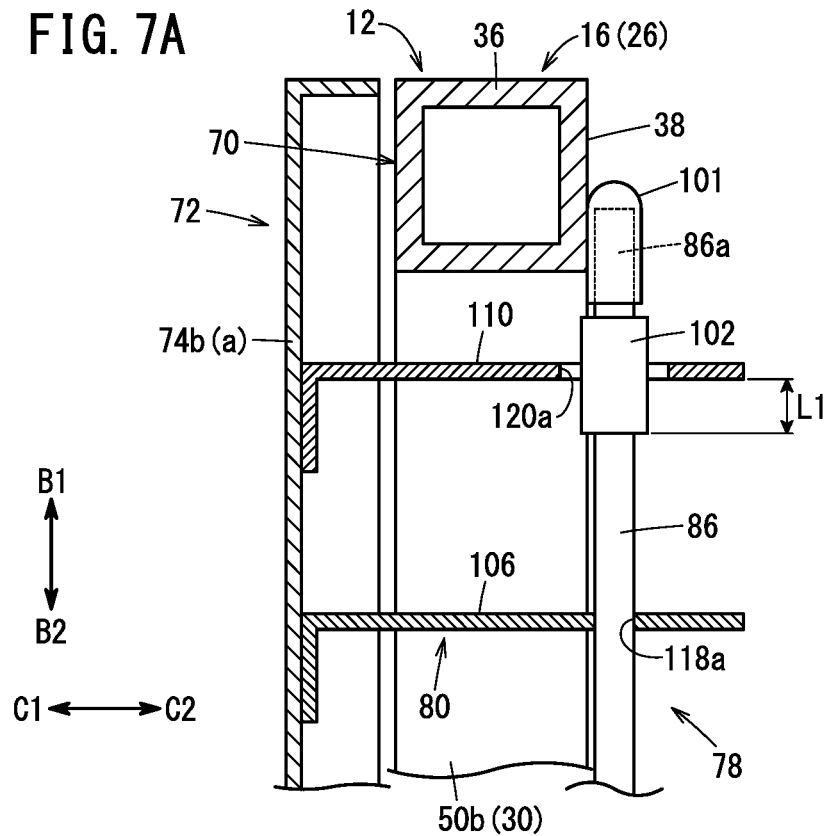
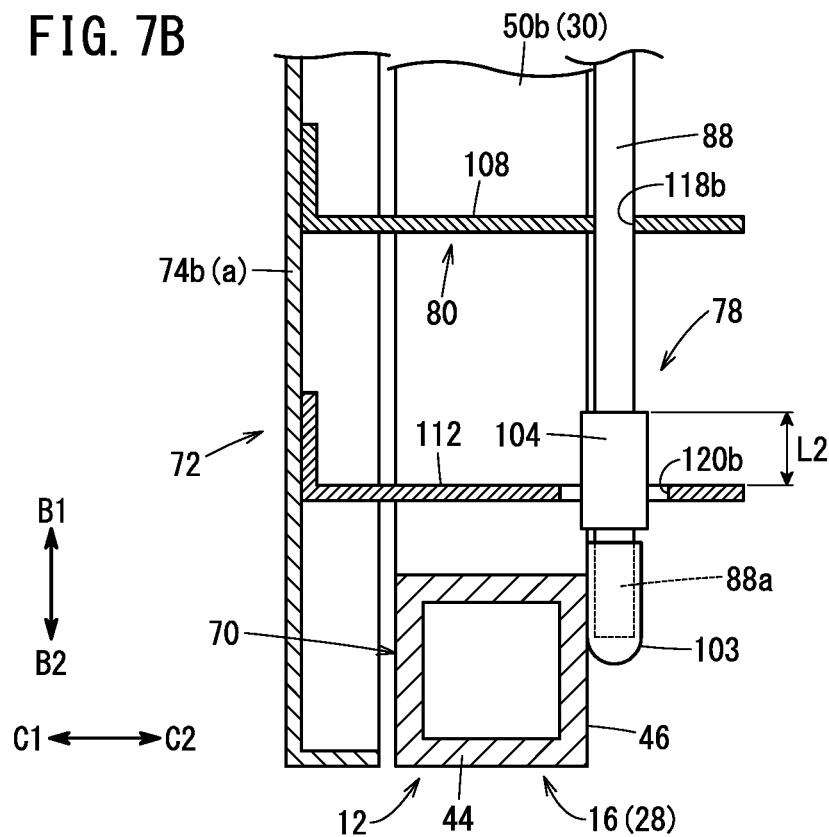

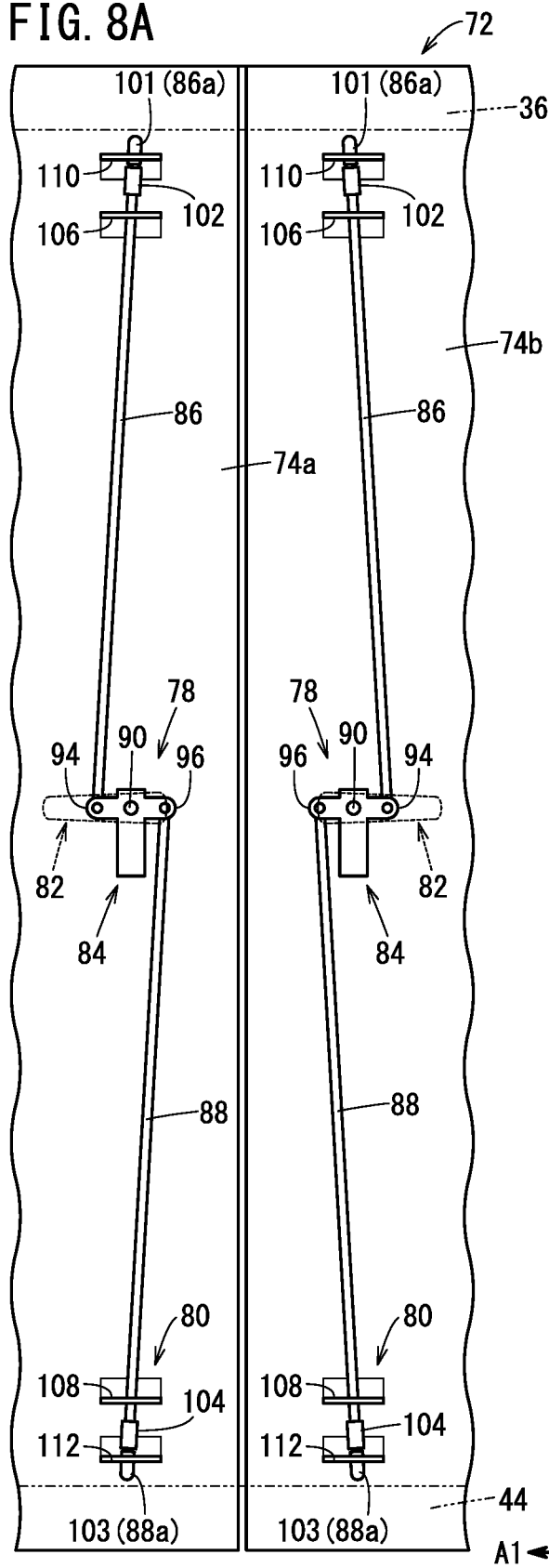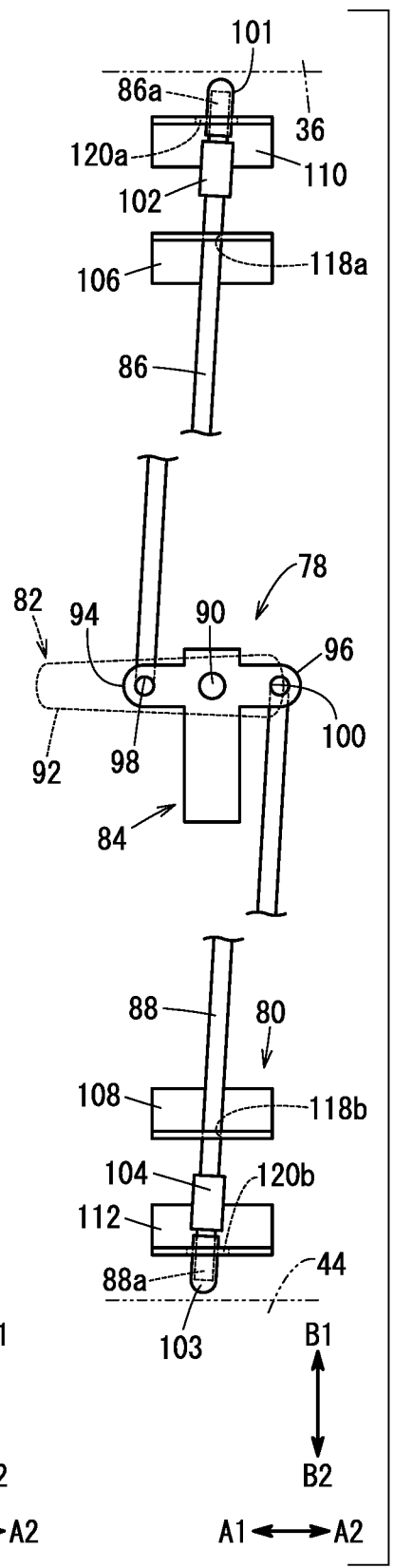

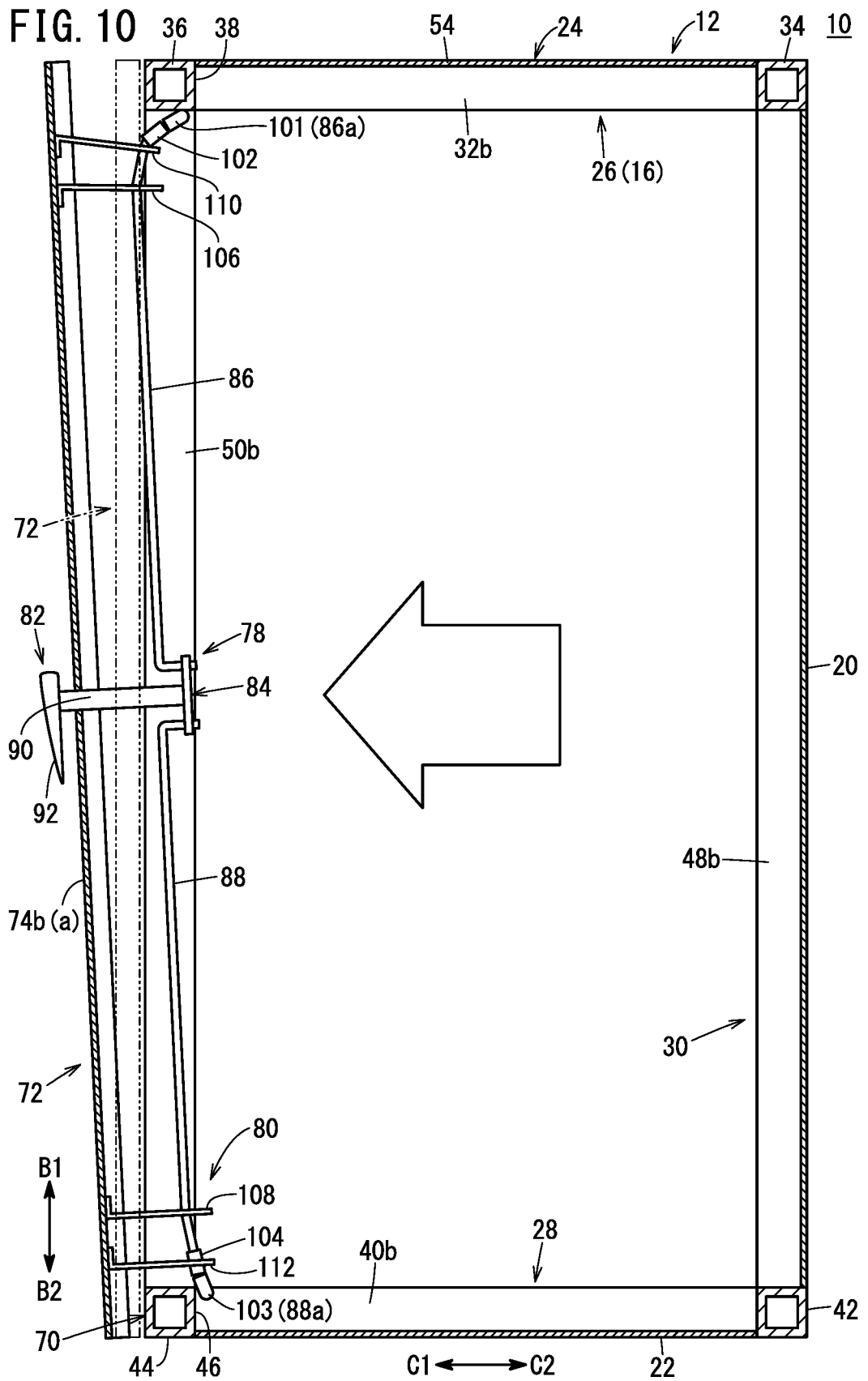

HYDROGEN PRODUCTION APPARATUS

CROSS-REFERENCE TO RELATED APPLICATIONS

This application is based upon and claims the benefit of priority from Japanese Patent Application No. 2021-009862 filed on Jan. 25, 2021, the contents of which are incorporated herein by reference.

BACKGROUND OF THE INVENTION

Field of the Invention

The present invention relates to a hydrogen production apparatus including a water electrolysis unit for generating hydrogen gas.

Description of the Related Art

Conventionally, a hydrogen production apparatus including a water electrolysis device has been known. The hydrogen production apparatus generates hydrogen gas by electrolyzing water. For example, when the generated hydrogen gas leaks inside the hydrogen production apparatus, the hydrogen gas may catch fire due to some cause such as an electrical component or static electricity. At this time, there is a risk that an explosion occurs inside the hydrogen production apparatus and constituent members of the hydrogen production apparatus are scattered to the surroundings.

In order to reduce damage caused by explosion inside the hydrogen production apparatus, an explosion release port is provided in a housing. The explosion release port can quickly discharge excessive pressure due to explosion, to the outside.

For example, a gas chromatograph oven disclosed in JP 2018-194300 A includes an oven chamber main body and a door. The oven chamber main body has a substantially rectangular parallelepiped shape, and the entire front surface thereof is open. The door opens and closes a front opening of the oven chamber main body. The oven chamber main body is formed by putting together a plurality of metal plate members through fitting or by using screws. The front opening of the oven chamber main body is opened and closed by the door. In the front opening, a substantially frame-shaped front frame metal plate member is attached to an outer metal plate member.

An explosion occurs when hydrogen gas or the like is accumulated inside the oven chamber main body and catches fire, in the gas chromatograph oven. Along with this explosion, the gas pressure in the internal space of the oven chamber main body rises rapidly. The strength of the left and right upper corners of the oven chamber main body or the attachment portions of the front frame metal plate member and the outer metal plate member is relatively low. Therefore, when an explosion occurs, the attachment portions of the oven chamber main body is damaged or broken and deformed. Thus, an opening is formed in the oven chamber main body. As a result, hydrogen gas or the like in the internal space flows out to the outside of the oven chamber main body through the opening of the oven chamber main body. Therefore, breakage or the like of the gas chromatograph oven is reduced.

SUMMARY OF THE INVENTION

For example, it is assumed that an opening/closing operation of the door is locked by a locking mechanism in a state where the front opening of the oven chamber main body is closed by the door. In this case, it is conceivable that the locking mechanism is engaged with a ceiling portion or the corner of the oven chamber main body. However, it is difficult to set the strength of the corner or the like of the oven chamber main body to be lower than the strength of other portions. Therefore, when an explosion occurs inside the oven chamber main body, it is difficult to open the oven chamber main body by the pressure of the explosion and release the pressure to the outside.

An object of the present invention is to solve the above-described problems.

A hydrogen production apparatus including: a water electrolysis unit that electrolyzes water to generate hydrogen gas; a storage unit that stores the hydrogen gas generated in the water electrolysis unit; a supply unit that supplies the hydrogen gas stored in the storage unit, to outside; an electrical unit that controls operation of at least the water electrolysis unit; and a housing that houses the water electrolysis unit, the storage unit, the supply unit, and the electrical unit, wherein the housing is made up of at least an upper frame disposed on an upper side of the housing in a height direction thereof and a lower frame disposed on a lower side thereof in the height direction, and includes an opening end opened in a lateral direction orthogonal to the height direction, and the housing further includes: an opening/closing door configured to be rotatably supported on the housing and configured to open and close the opening end; and a locking mechanism disposed on the opening/closing door and configured to restrict an opening operation of the opening/closing door with the opening end being closed; and wherein the locking mechanism includes first and second rods configured to move along a height direction of the opening/closing door orthogonal to an opening direction of the opening end; and in an opening operation restricted state in which the opening end is closed by the opening/closing door and the opening operation of the opening/closing door is restricted by the locking mechanism, an upper end of the first rod is disposed on an opposite side of the upper frame from the opening/closing door, and a lower end of the second rod is disposed on an opposite side of the lower frame from the opening/closing door; in the opening operation restricted state, a first enlarged diameter portion formed in the vicinity of the upper end of the first rod and enlarged in diameter radially outwardly is in a state of being inserted into a first guide portion disposed on the opening/closing door and extending in a direction opposite to the opening direction of the opening end, and a second enlarged diameter portion formed in the vicinity of the lower end of the second rod and enlarged in diameter radially outwardly is in a state of being inserted into a second guide portion disposed on the opening/closing door and extending in the direction opposite to the opening direction of the opening end; and an axial distance between an upper end of the second enlarged diameter portion and the second guide portion is larger than an axial distance between a lower end of the first enlarged diameter portion and the first guide portion.

According to the present invention, in the hydrogen production apparatus, when the opening end of the housing is closed by the opening/closing door and hydrogen gas produced thereinside leaks and ignites to thereby cause an explosion, there are cases in which the opening/closing door may be pressed outward due to a rapidly increased pressure. In this case, the first enlarged diameter portion disposed in the vicinity of the upper end of the first rod in the locking mechanism is separated from the first guide portion and deformed before the second enlarged diameter portion disposed in the vicinity of the lower end of the second rod is separated. As a result, the first rod is disengaged from the upper frame. With the release of the engagement, the opening operation restricted state of the upper part of the opening and closing door by the first rod can be released.

As a result, even when an excessive pressure occurs in the housing, only the upper part of the opening/closing door is opened to thereby open the opening end of the housing, in first. As a result, the pressure can be reliably released from the open portion at and near the upper part to the outside of the housing. It is possible to prevent the lower part and its nearby portion of the opening/closing door from being opened or disengaged. Therefore, for example, when there is a person around the opening/closing door, it is possible to reliably avoid contact between the opening/closing door and the person.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6A is an enlarged front view of the opening/closing door constituting the hydrogen production apparatus of FIG. 2 as viewed from the inside of a housing, and FIG. 6B is a partially omitted enlarged configuration diagram of an opening/closing switching mechanism in FIG. 6A;

FIG. 7A is an enlarged cross-sectional view showing an upper rod and its vicinity of the opening/closing switching mechanism in FIG. 4, and FIG. 7B is an enlarged cross-sectional view showing a lower rod and its vicinity of the opening/closing switching mechanism in FIG. 4;

FIG. 8A is an enlarged front view of the opening/closing door being released from a locked state by the opening/closing switching mechanism as viewed from the inside of the housing, and FIG. 8B is a partially omitted enlarged configuration diagram of the opening/closing switching mechanism in FIG. 8A;

FIG. 10 is an overall cross-sectional view showing a case where an excessive pressure occurs inside the hydrogen production apparatus of FIG. 4 and part of the opening/closing door is opened;

DESCRIPTION OF THE INVENTION

Figure 1:
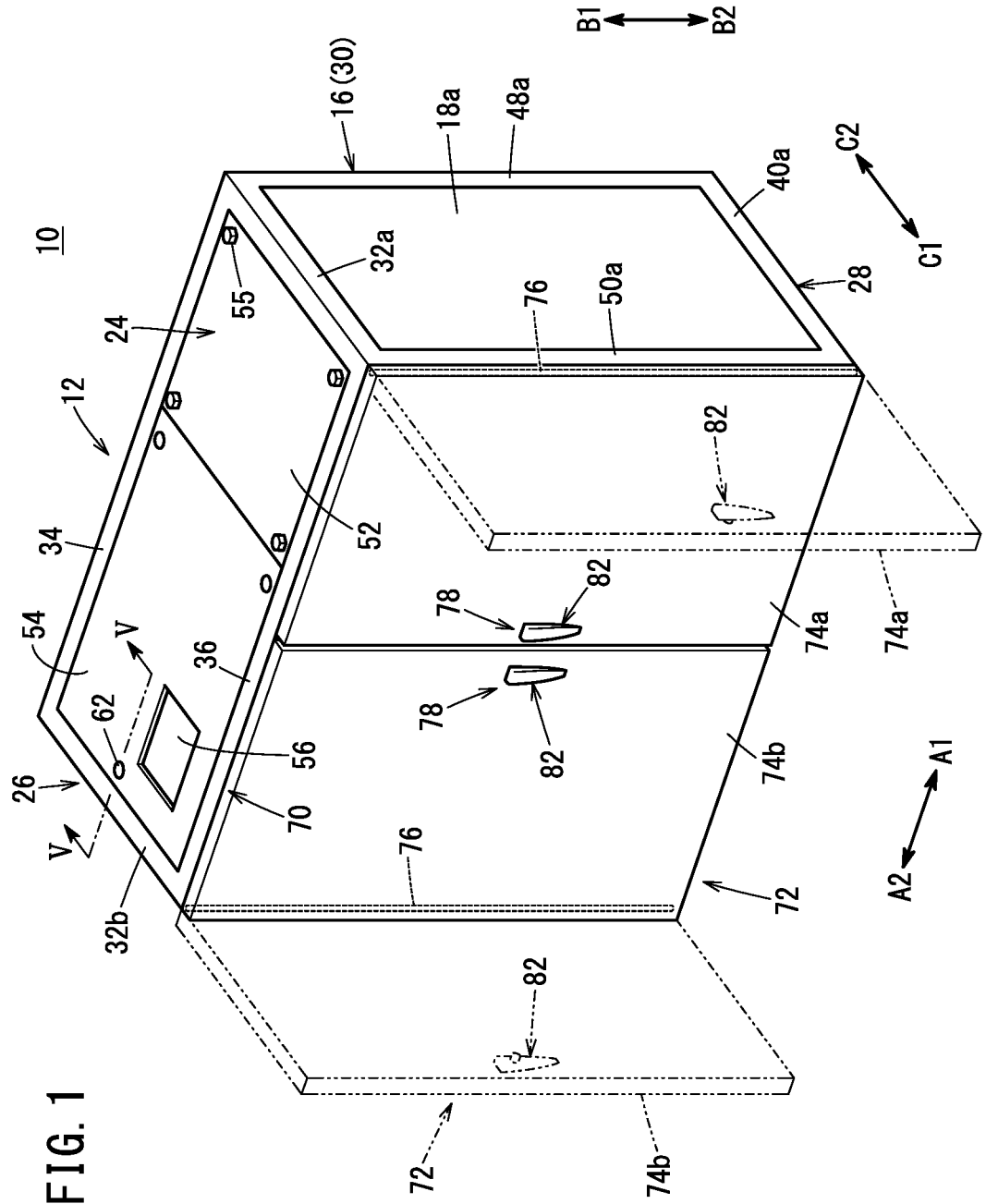
FIG. 1 is an external perspective view of a hydrogen production apparatus according to an embodiment of the present invention.

As shown in FIGS. 1 to 4, a hydrogen production apparatus 10 is, for example, a so-called hydrogen gas station that supplies hydrogen as a fuel gas to a fuel cell vehicle (object) (not shown). The hydrogen production apparatus 10 includes a housing 12 and a water electrolysis system 14. The water electrolysis system 14 is housed inside the housing 12.

The cross-sectional shape of the housing 12 is, for example, a substantially rectangular shape elongated in a width direction (arrow A1 and A2 directions) as viewed from above. The housing 12 includes a frame 16, a pair of side panels 18a and 18b, a rear panel 20, a bottom panel 22, and a ceiling panel (ceiling plate) 24. The pair of side panels 18a and 18b are disposed on respective both sides in the width direction of the housing 12. The rear panel 20 is disposed at rear ends of the side panels 18a and 18b. The bottom panel 22 is disposed at lower ends of the side panels 18a and 18b and the rear panel 20. The ceiling panel (ceiling plate) 24 is disposed on upper ends of the side panels 18a and 18b and the rear panel 20. The side panels 18a, 18b, the rear panel 20, the bottom panel 22, and the ceiling panel 24 are each mounted to a frame 16.

The frame 16 includes an upper frame portion 26, a lower frame portion 28, and a connection frame portion 30. The upper frame portion 26 constitutes an upper end of the housing 12. The lower frame portion 28 constitutes a lower end of the housing 12. The connection frame portion 30 extends in an up-down direction (vertical direction) (directions of arrows B1 and B2). The connection frame portion 30 connects the upper frame portion 26 and the lower frame portion 28.

The upper frame portion 26 includes first front-to-rear frame pieces 32a and 32b, a first rear frame piece 34, and a first front frame piece (upper frame) 36. Each of the first front-to-rear frame pieces 32a and 32b extends horizontally along the front-rear direction (arrow C1 and C2 directions) at both ends of the upper frame portion 26 in the width direction. The first rear frame piece 34 extends along the width direction of the upper frame portion 26 (the direction of arrows A1 and A2). The first rear frame piece 34 connects rear ends of the first front-to-rear frame pieces 32a and 32b to each other. The first front frame piece 36 extends along the width direction (arrow A1, A2 direction) of the upper frame portion 26. The first front frame piece 36 connects front ends of the first front-to-rear frame pieces 32a and 32b. Thus, the first front-to-rear frame pieces 32a and 32b are arranged substantially parallel to each other. The first rear frame piece 34 and the first front frame piece 36 are disposed substantially parallel to each other.

The cross-sectional shape of the first front frame piece 36 is substantially rectangular when viewed from the extending direction thereof. A rear end (an end portion in the arrow C2 direction) of the first front frame piece 36 includes a first wall portion 38. The first wall portion 38 extends in the up-down direction (the direction of arrows B1 and B2). The first wall portion 38 is flat along the up-down direction. The first wall portion 38 extends with the same cross-sectional shape along the width direction (the direction of arrows A1 and A2). The first wall portion 38 extends from one first front-to-rear frame pieces 32a to the other first front-to-rear frame piece 32b.

The lower frame portion 28 includes second front-to-rear frame pieces 40a and 40b, a second rear frame piece 42, and a second front frame piece (lower frame) 44. The second front-to-rear frame pieces 40a, 40b extend horizontally along the front-rear direction (arrow C1, C2 direction) at respective both ends of the lower frame portion 28 in the width direction. The second rear frame piece 42 extends along the width direction of the lower frame portion 28 (the direction of arrows A1 and A2). The second rear frame piece 42 connects rear ends of the second front-to-rear frame pieces 40a and 40b to each other. The second front frame piece 44 extends along the width direction of the lower frame portion 28. The second front frame piece 44 connects front ends of the first front-to-rear frame pieces 32a and 32b.

The cross-sectional shape of the second front frame piece 44 is substantially rectangular when viewed from the extending direction thereof. A rear end (an end portion in the arrow C2 direction) of the second front frame piece 44 includes a second wall portion 46. The second wall portion 46 extends in the up-down direction (the direction of arrows B1 and B2). The second wall portion 46 is flat along the up-down direction. The second wall portion 46 extends with the same cross-sectional shape along the width direction (arrow A1, A2 direction). The second wall portion 46 extends from one second front-to-rear frame piece 40a to the other second front-to-rear frame piece 40b. The first wall portion 38 of the upper frame portion 26 and the second wall portion 46 of the lower frame portion 28 are located at the same position in the front-rear direction (the direction of arrows C1 and C2) (see FIG. 4).

The second front-to-rear frame pieces 40a and 40b are disposed substantially parallel to each other. The second rear frame piece 42 and the second front frame piece 44 are disposed substantially parallel to each other.

The second front-to-rear frame pieces 40a and 40b are disposed substantially parallel to the first front-to-rear frame pieces 32a and 32b, respectively. The second front frame piece 44 is disposed substantially parallel to the first front frame piece 36. The second rear frame piece 42 is disposed substantially parallel to the first rear frame piece 34.

The connection frame portion 30 includes a pair of rear end frame pieces 48a and 48b and a pair of front end frame pieces 50a and 50b. The rear end frame piece 48a connects the rear end of the first front-to-rear frame piece 32a and the rear end of the second front-to-rear frame piece 40a. The rear end frame piece 48a connects one end of the first rear frame piece 34 and one end of the second rear frame piece 42. The rear end frame piece 48b connects the rear end of the first front-to-rear frame piece 32b and the rear end of the second front-to-rear frame piece 40b. The rear end frame piece 48b connects the other end of the first rear frame piece 34 and the other end of the second rear frame piece 42. The front end frame piece 50a connects the front end of the first front-to-rear frame piece 32a and the front end of the second front-to-rear frame piece 40a. The front end frame piece 50a connects one end of the first front frame piece 36 and one end of the second front frame piece 44. The front end frame piece 50b connects the front end of the first front-to-rear frame piece 32b and the front end of the second front-to-rear frame piece 40b. The front end frame piece 50b connects the other end of the first front frame piece 36 and the other end of the second front frame piece 44. Thus, the rear end frame pieces 48a and 48b and the front end frame pieces 50a and 50b are arranged substantially parallel to each other. The rear end frame pieces 48a, 48b and the front end frame pieces 50a, 50b are substantially orthogonal to the first front-to-rear frame pieces 32a, 32b, the second front-to-rear frame pieces 40a, 40b, the first and second front frame pieces 36, 44, and the first and second rear frame pieces 34, 42.

The side panel 18a is fitted into a rectangular frame formed by the first front-to-rear frame piece 32a of the upper frame portion 26, the second front-to-rear frame piece 40a of the lower frame portion 28, the rear end frame piece 48a, and the front end frame piece 50a. The side panel 18b is fitted into a rectangular frame formed by the first front-to-rear frame piece 32b of the upper frame portion 26, the second front-to-rear frame piece 40b of the lower frame portion 28, the rear end frame piece 48b, and the front end frame piece 50b. Each of the side panels 18a and 18b is fixed to the frame 16 by fastening screws (not shown). Thus, the pair of side panels 18a and 18b constitute side walls on both sides of the housing 12 in the width direction.

The rear panel 20 is fitted into a rectangular frame formed by the first rear frame piece 34 of the upper frame portion 26, the second rear frame piece 42 of the lower frame portion 28, and the pair of rear end frame pieces 48a and 48b. The rear panel 20 is fixed to the frame 16 by a plurality of fastening screws (not shown).

The bottom panel 22 is fitted into a rectangular frame formed by the second front-to-rear frame pieces 40a and 40b, the second rear frame piece 42, and the second front frame piece 44 in the lower frame portion 28. The bottom panel 22 is fixed to the frame 16 by a plurality of fastening screws (not shown). Thus, the bottom panel 22 constitutes a bottom wall of the housing 12.

The ceiling panel 24 is fitted into a rectangular frame formed by the first front-to-rear frame pieces 32a and 32b, the first rear frame piece 34, and the first front frame piece 36 in the upper frame portion 26. The ceiling panel 24 includes a first panel body (divided piece) 52 and a second panel body (divided piece) 54. The first panel body (divided piece) 52 is disposed on one side in the width direction (arrow A1 direction) of the frame 16. The second panel body (divided piece) 54 is disposed adjacent to the first panel body 52 on the other side in the width direction (direction of arrow A2) of the frame 16. That is, the ceiling panel 24 is divided into two parts (two pieces) in the width direction of the housing 12 (the direction of arrows A1 and A2).

The second panel body 54 is disposed above a water electrolysis unit 122 in the water electrolysis system 14 described later. The second panel body 54 includes a ventilation opening (opening) 56. The ventilation opening 56 penetrates through the second panel body 54 and opens in a substantially rectangular shape. Thus, the inside and the outside of the housing 12 communicate with each other through the ventilation opening 56 penetrating the ceiling panel 24.

The first panel body 52 is firmly fixed to the first front-to-rear frame piece 32a, the first rear frame piece 34, and the first front frame piece 36 by a plurality of (for example, four) fastening screws 55.

One end of the second panel body 54 in the width direction is disposed adjacent to the first panel body 52 (in the arrow A1 direction). One end of the second panel body 54 in the width direction (end portion in the arrow A1 direction) is placed on the first rear frame piece 34 and the first front frame piece 36. The other end of the second panel body 54 in the width direction (end portion in the arrow A2 direction) is placed on the first front-to-rear frame piece 32b. An outer edge of the second panel body 54 is placed on the first rear frame piece 34, the first front frame piece 36, and the first front-to-rear frame piece 32b. The second panel body 54 includes three panel holes 58 provided in the vicinity of the outer edge thereof. Each of the panel holes 58 penetrates the second panel body 54 in the up-down direction (the direction of the arrows B1 and B2). Each of the panel holes 58 is spaced apart from the other panel holes 58 along the outer edge of the second panel body 54.

Each of the first rear frame piece 34, the first front frame piece 36, and the first front-to-rear frame piece 32b has a frame hole 60 (see FIG. 5) that opens toward the corresponding panel hole 58. The outer edge of the second panel body 54 is placed on the first rear frame piece 34, the first front frame piece 36, and the first front-to-rear frame piece 32b. Thereafter, three rivets 62 are engaged with the panel holes 58 and the frame holes 60 of the frame pieces 34, 36, and 32b, respectively. Thus, the outer edge of the second panel body 54 is fixed to the frame 16.

Figure 5:
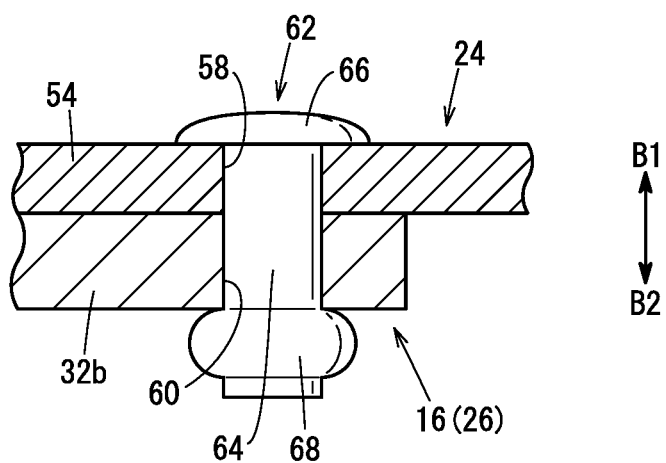
FIG. 5 is a cross-sectional view taken along line V-V of FIG. 1.
Figure 9A:
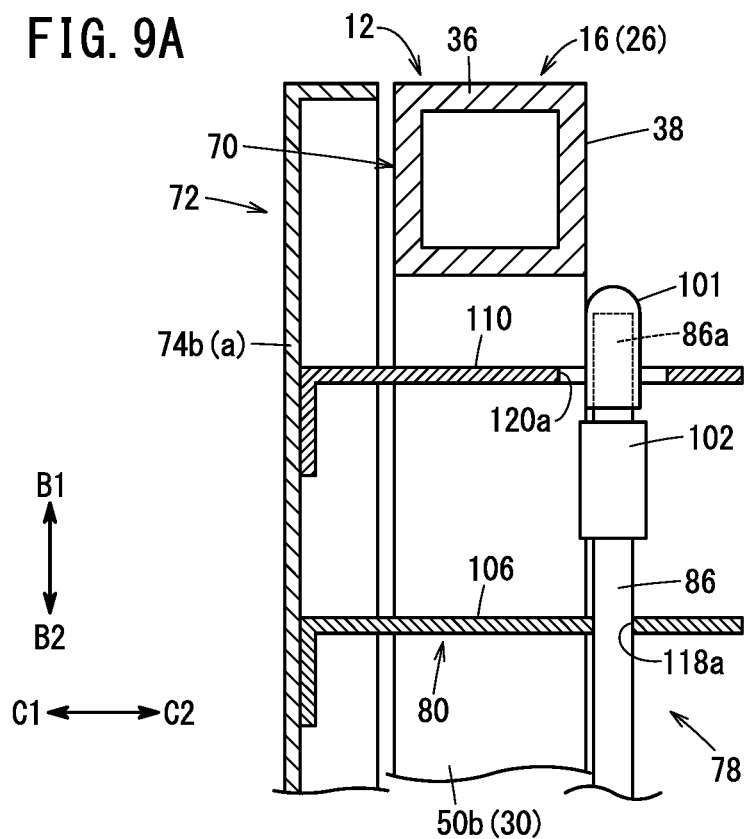
FIG. 9A is an enlarged cross-sectional view showing an upper rod and its vicinity of the opening/closing switching mechanism in FIG. 8A.
Figure 9B:
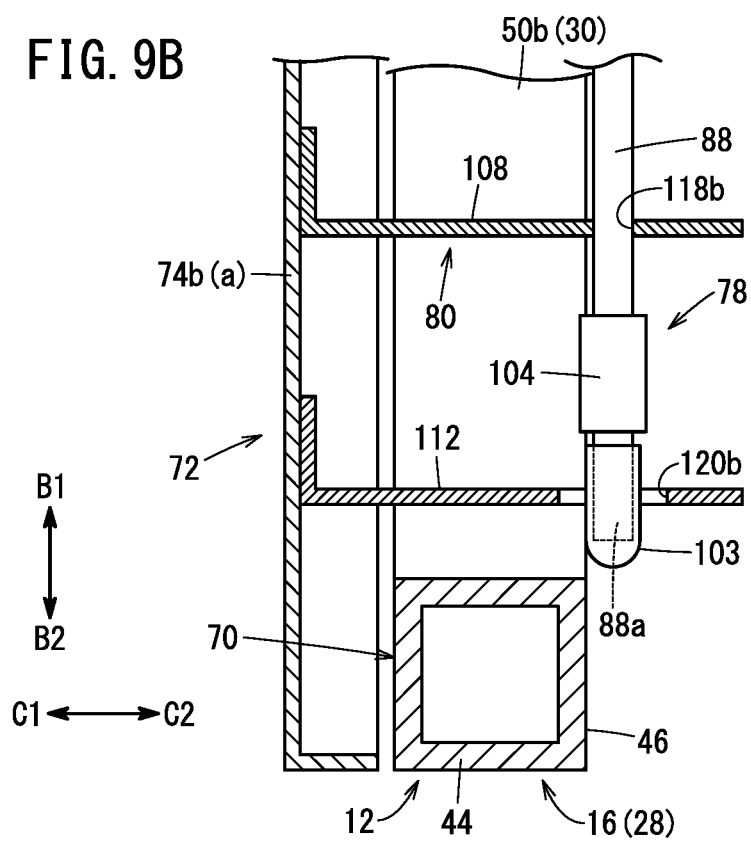
FIG. 9B is an enlarged cross-sectional view showing a lower rod and its vicinity of the opening/closing switching mechanism in FIG. 8A.

As shown in FIG. 5, the rivet 62 is formed of, for example, a plastically deformable metal material. The rivet 62 includes a main body portion 64, a flange portion 66, and a crimped portion 68. The cross-sectional shape of the main body portion 64 is circular. The main body portion 64 has a shaft shape. The main body portion 64 is inserted through each of the panel holes 58 of the ceiling panel 24 and each of the frame holes 60 of the frame pieces 32b, 34, and 36. The flange portion 66 is disposed at one end (upper end) of the main body portion 64. The flange portion 66 has a circular disk shape radially outwardly extending from the main body portion 64. The crimped portion 68 is disposed at the other end (lower end) of the main body portion 64.

When the outer edge of the second panel body 54 is placed on the first rear frame piece 34, the first front frame piece 36, and the first front-to-rear frame piece 32b, the frame holes 60 of the frame pieces 32b, 34, and 36 are aligned with the respective panel holes 58 in a straight line in the up-down direction (the direction of the arrows B1 and B2). The main body portion 64 of the rivet 62 is inserted into the panel hole 58 from the upper surface of the second panel body 54, and the flange portion 66 is brought into contact with the upper surface of the second panel body 54. As a result, the main body portions 64 of the three rivets 62 protrude from the lower surfaces of the first rear frame piece 34, the first front frame piece 36, and the first front-to-rear frame piece 32b. The lower end of each main body portion 64 is pressed and deformed in the axial direction (upward, arrow B1 direction). As a result, the lower end of each main body portion 64 enlarges in diameter radially outward and becomes the crimped portion 68.

The crimped portion 68 regulates attachment and detachment of the second panel body 54 to and from the frame 16 in the up-down direction (directions of arrows B1 and B2). The rivet 62 including the crimped portion 68 fixes the second panel body 54 and the frame 16 to each other. The ceiling panel 24 including the first and second panel bodies 52 and 54 constitutes an upper wall of the housing 12. The first panel body 52 is fixed to the frame 16 by four fastening screws 55. The second panel body 54 is fixed to the frame 16 by the three rivets 62. Thus, the fixing strength of the second panel body 54 to the frame 16 is lower than the fixing strength of the first panel body 52 to the frame 16. In other words, the second panel body 54 is fixed to the housing 12 with a lower fixing strength than the first panel body 52 so as to be easily detached from the housing 12.

One end of the second panel body 54 in the width direction (end portion in the arrow A1 direction) is fixed by two of the rivets 62. The other end of the second panel body 54 in the width direction (end portion in the arrow A2 direction) is fixed by one of the rivets 62. Therefore, the fixing strength of the second panel body 54 to the frame 16 at the other end in the width direction is lower than the fixing strength of the second panel body 54 to the frame 16 at the one end in the width direction.

The side panels 18a and 18b of the housing 12 are arranged upright in the up-down direction (directions of arrows B1 and B2). One side panel 18a and the other side panel 18b are arranged substantially parallel to each other. Each of the bottom panel 22 and the ceiling panel 24 is arranged substantially horizontally. The bottom panel 22 and the ceiling panel 24 are arranged substantially orthogonal to the side panels 18a, 18b. That is, the housing 12 has a box shape recessed rearward (in the direction of the arrow C2) from the front end (opening end) 70. The front end 70 of the housing 12 has a substantially rectangular shape which is long in the width direction. The housing 12 is open toward the front side (the arrow C1 direction, opening direction).

An opening/closing door 72 is disposed at the front end 70 of the housing 12. The opening/closing door 72 is divided at the center of the front end 70 in the width direction. The opening/closing door 72 can open and close the front end 70. The opening/closing door 72 includes a pair of door bodies 74a and 74b, for example, formed by dividing a plate into two in the width direction (the direction of arrows A1 and A2) of the housing 12.

Each of the door bodies 74a and 74b is, for example, a flat panel having substantially the same height as the side panels 18a and 18b. One end portion of each of the door bodies 74a and 74b in the width direction is rotatably supported by the front end 70 of the corresponding one of the side panels 18a and 18b. The one end portion of each of the door bodies 74a and 74b in the width direction is supported by a support shaft 76 extending in the up-down direction (the direction of arrows B1 and B2). That is, the pair of door bodies 74a and 74b are double doors that laterally open in the left-right direction (directions of arrows A1 and A2) from the center of the housing 12 in the width direction with the end portions of the housing 12 in the width direction as pivot points.

Figure 2:
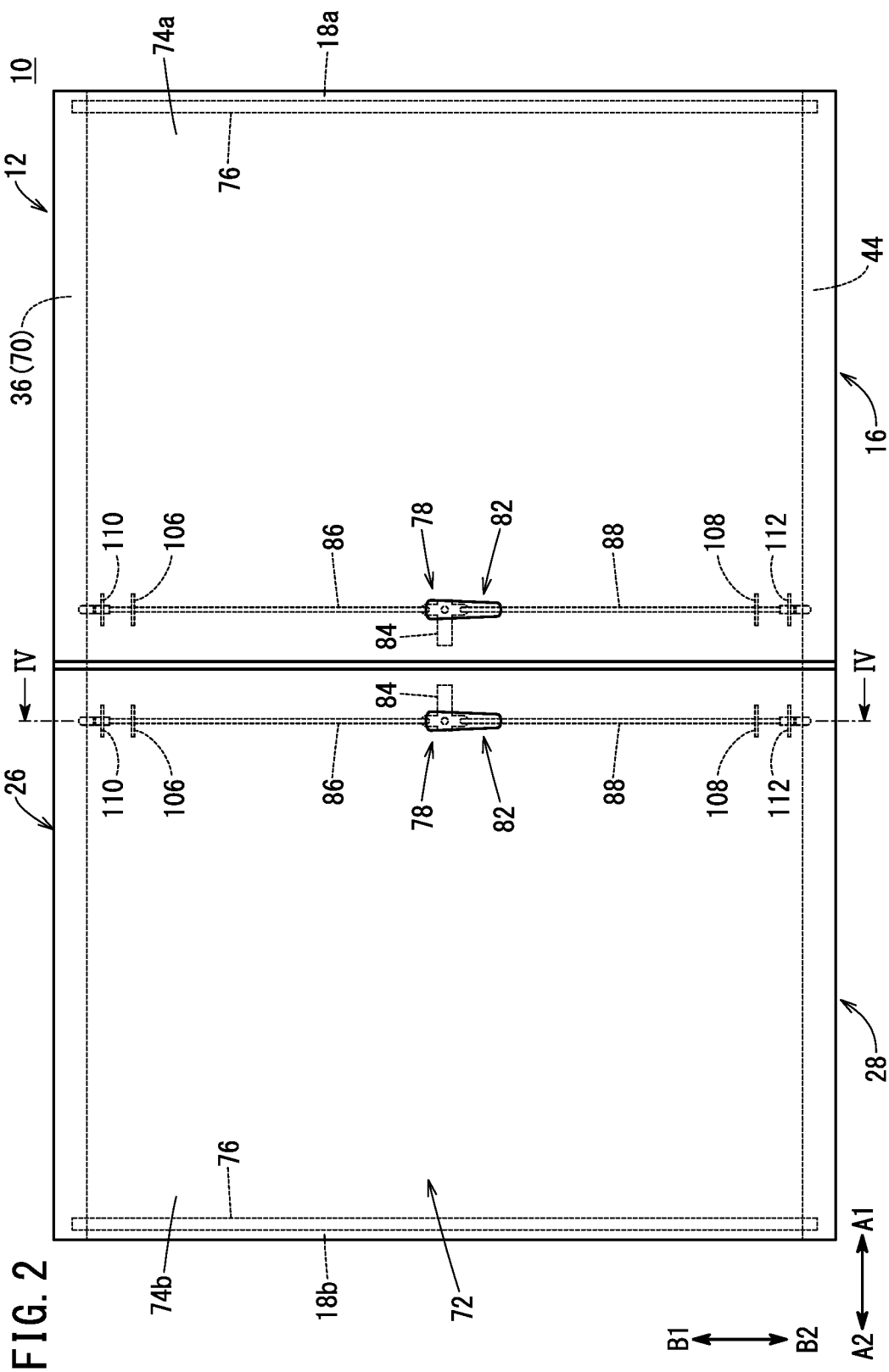
FIG. 2 is an overall front view of the hydrogen production apparatus shown in FIG. 1.
Figure 3:
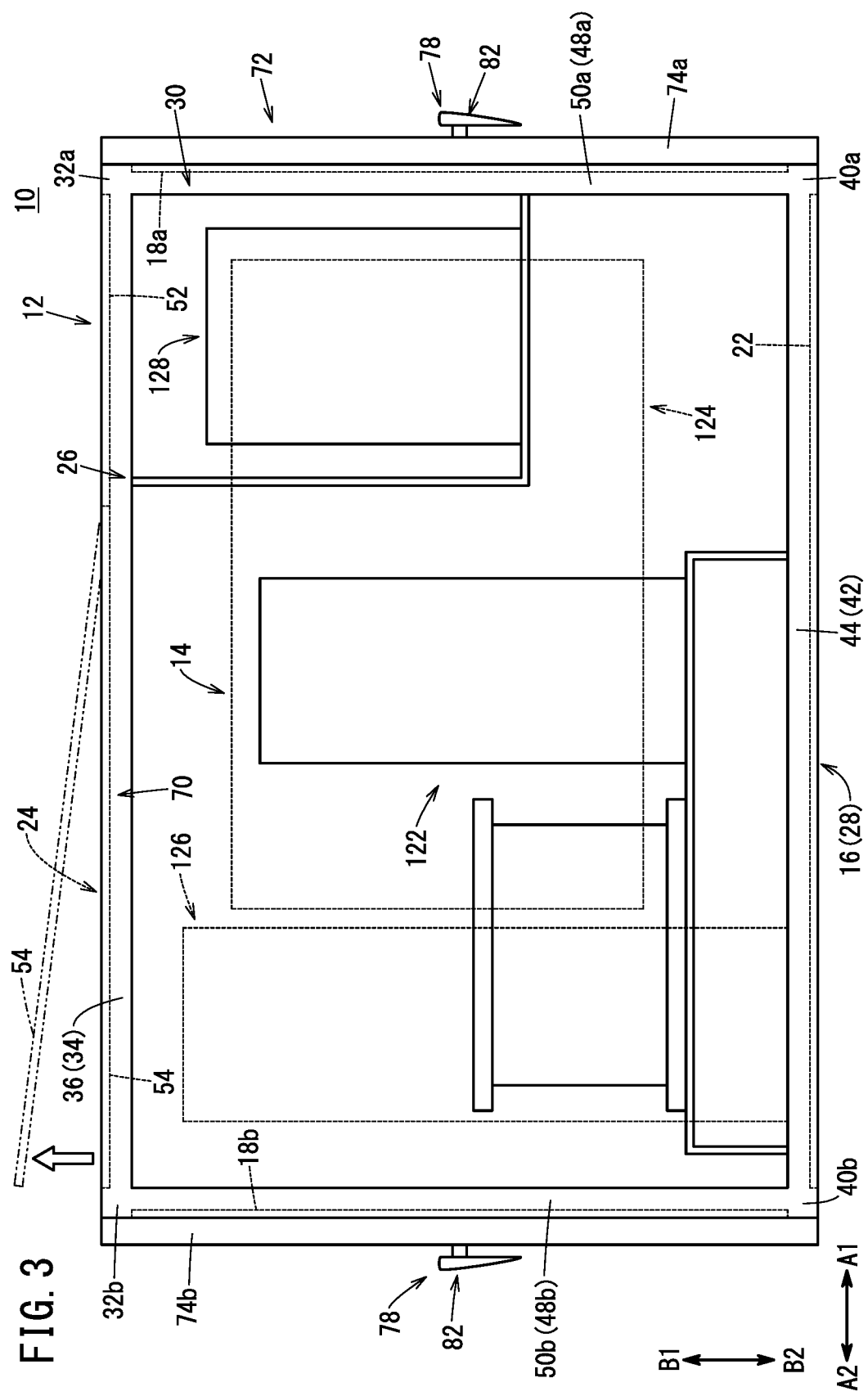
FIG. 3 is an overall front view showing a state in which an opening/closing door of the hydrogen production apparatus of FIG. 2 is opened.
Figure 4:
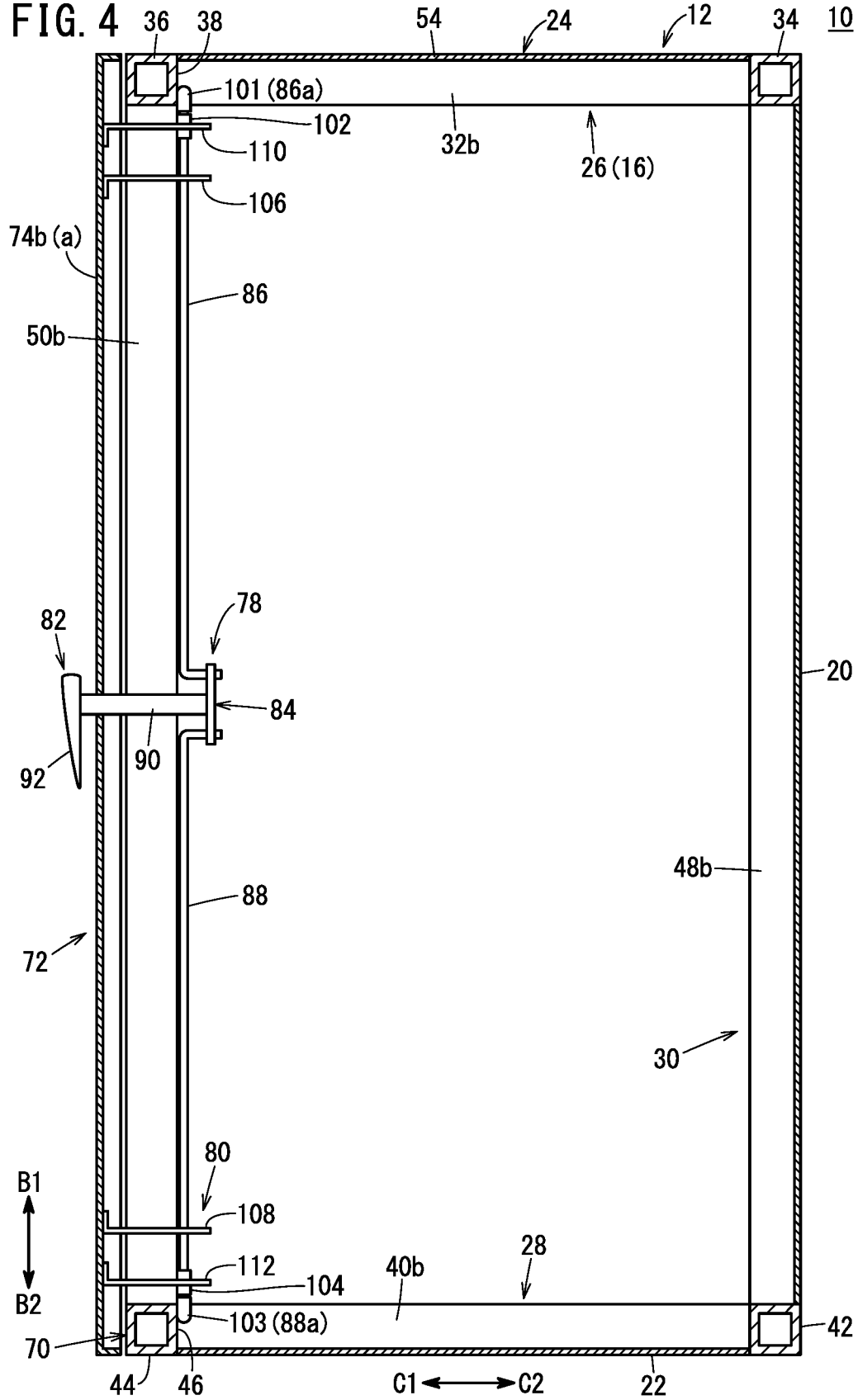
FIG. 4 is a partially omitted cross-sectional view taken along line IV-IV of FIG. 2.

As shown in FIGS. 1, 2, and 4, for example, the opening/closing door 72 is substantially parallel to the rear panel 20 when the front end 70 of the housing 12 is closed. When the opening/closing door 72 is opened from the front end 70, as shown in FIG. 3, for example, the door bodies 74a and 74b rotate, and the door bodies 74a and 74b are separated from each other at the center of the opening/closing door 72 in the width direction. As a result, the door body 74a is placed in substantially parallel to the side panel 18a, and the door body 74b is placed in substantially parallel to the side panel 18b. (See a two-dot chain line in FIG. 1).

As shown in FIGS. 2 to 4 and 6A to 9B, each of the end portions of the door bodies 74a and 74b located at the center of the opening/closing door 72 in the width direction includes an opening/closing switching mechanism (locking mechanism) 78 and a support mechanism 80. The opening/closing switching mechanism 78 switches the opening/closing door 72 at the front end 70 of the housing 12 between an open state and a closed state. The support mechanism 80 supports an upper rod (first rod) 86 and a lower rod (second rod) 88 of the opening/closing switching mechanism 78.

The opening/closing switching mechanism 78 extends in the up-down direction (the direction of arrows B1 and B2) along the width-direction end portions of the door bodies 74a and 74b.

The opening/closing switching mechanism 78 includes opening/closing levers (operating members) 82, cam plates (connecting bodies) 84, the upper rods 86, and the lower rods 88. The opening/closing lever 82 is disposed outside the opening/closing door 72. The cam plate 84 is disposed inside the opening/closing door 72 and connected to the opening/closing lever 82. The upper rod 86 is disposed inside the opening/closing door 72 and extends upward (in the direction of the arrow B1) from the center in the height direction. The upper rod 86 is connected to the cam plate 84. The lower rod 88 is disposed inside the opening/closing door 72 and extends downward (in the direction of the arrow B2) from the center in the height direction. Each of the lower rods 88 is connected to the cam plate 84.

The opening/closing lever 82 is, for example, substantially L-shaped. Each of the opening/closing levers 82 is disposed near the center of the door bodies 74a and 74b in the height direction. The opening/closing lever 82 includes a shaft portion 90 and a grip portion 92. The shaft portion 90 linearly extends toward the opening/closing door 72 and penetrates the opening/closing door 72. The grip portion 92 is disposed apart from the door bodies 74a and 74b by a predetermined distance. The grip portion 92 extends substantially orthogonal to an end portion of the shaft portion 90.

One end portion of the shaft portion 90 of the opening/closing lever 82 is inserted into a hole (not shown) opened in the opening/closing door 72. Thus, the opening/closing lever 82 is rotatably supported by the opening/closing door 72. When the opening/closing door 72 is opened and closed, an operator (not shown) grips and rotates the grip portion 92 of the opening/closing lever 82.

In a locked state in which an opening operation of the opening/closing door 72 is restricted by the opening/closing switching mechanism 78, the grip portion 92 of the opening/closing lever 82 is aligned with the up-down direction (the direction of the arrows B1 and B2). In an unlocked state in which the opening operation of the opening/closing door 72 is allowed, the grip portion 92 of the opening/closing lever 82 is disposed at an inclined position at which the grip portion is rotated by a predetermined angle from the up-down direction (the directions of the arrows B1 and B2).

As shown in FIGS. 4, 6A, 6B, 8A and 8B, the cam plate 84 is substantially T-shaped. The shaft portion 90 of the opening/closing lever 82 is connected to a central portion of the cam plate 84. The cam plate 84 includes a first connecting portion (first end portion) 94 and a second connecting portion (second end portion) 96. The first connecting portion 94 extends from the center of the cam plate 84 toward one side. The second connecting portion 96 extends from the center of the cam plate 84 toward the other side, i.e., in a direction opposite to the direction in which the first connecting portion 94 extends from the center portion of the cam plate 84.

The first connecting portion 94 is disposed substantially so as to extend upward, in the opening/closing door 72. The first connecting portion 94 protrudes from the center of the cam plate 84 by a predetermined length. The distal end of the first connecting portion 94 includes a support hole 98. The support hole 98 penetrates through the first connecting portion 94. A lower end of the upper rod 86 to be described later is rotatably inserted into the support hole 98.

The second connecting portion 96 is disposed so as to extend substantially downward, in the opening/closing door 72. The second connecting portion 96 protrudes from the center of the cam plate 84 by a predetermined length. The second connecting portion 96 is arranged in alignment with the first connecting portion 94. The distal end of the second connecting portion 96 includes a support hole 100. The support hole 100 penetrates through the second connecting portion 96. An upper end of the lower rod 88, which will be described later, is rotatably inserted into the support hole 100.

The cam plate 84 rotates integrally with the opening/closing lever 82 by rotating the opening/closing lever 82 connected to the shaft portion 90. As the opening/closing lever 82 rotates, the first and second connecting portions 94 and 96 rotate about the center of the cam plate 84 by a predetermined angle.

At the time of locking in which the opening operation of the opening/closing door 72 is restricted, as illustrated in FIGS. 1, 2, 4, 6A, and 6B, the grip portion 92 of the opening/closing lever 82 is aligned with the up-down direction (the direction of arrows B1 and B2). The first and second connecting portions 94, 96 of the cam plate 84 are disposed along the up-down direction.

In an unlocked state in which the opening operation of the opening/closing door 72 can be performed, as shown in FIGS. 8A and 8B, the first and second connecting portions 94 and 96 of the cam plate 84 are inclined at a predetermined angle from the up-down direction.

The upper rod 86 is a shaft body having a constant diameter and made of, for example, a metal material. The upper rod 86 is disposed on the upper side of the center of the opening/closing door 72 in the height direction (in the direction of the arrow B1) and extends along the up-down direction. A lower end of the upper rod 86 is bent substantially at a right angle toward a side opposite to the opening/closing door 72. In other words, the lower end of the upper rod 86 is bent rearward (in the direction of the arrow C2) substantially at a right angle. The lower end of the upper rod 86 is inserted into the support hole 98 of the first connecting portion 94 of the cam plate 84 (see FIG. 4).

As illustrated in FIGS. 4, 6A, 6B, 7A, 8A, 8B, and 9A, the upper rod 86 is inserted into a first rod hole 118a of a first slider 106, which will be described later, disposed on an inner surface of the opening/closing door 72. Accordingly, the upper rod 86 is supported by the opening/closing door 72 so as to be movable in the up-down direction (the direction of the arrows B1 and B2).

An upper end (axially upper end) 86a of the upper rod 86 is covered with a first cap member 101. The first cap member 101 has a bottomed tubular shape having a bottom portion on an upper side (in a direction of an arrow B1). The first cap member 101 is formed of an elastic material such as rubber or resin, for example. An upper collar member (first enlarged diameter portion) 102 is mounted near the upper end 86a of the upper rod 86. The upper collar member 102 covers the outer peripheral surface of the upper end 86a.

The upper collar member 102 has a predetermined length along the axial direction of the upper rod 86 (the directions of the arrows B1 and B2). The upper collar member 102 is fixed, for example, to a position spaced downward from the upper end 86a (in the direction of the arrow B2) by a predetermined distance. The upper collar member 102 is fixed to the upper end 86a of the upper rod 86 by welding or the like, for example. That is, in the vicinity of the upper end 86a of the upper rod 86, the shaft diameter of the upper rod 86 is increased by mounting the upper collar member 102. Therefore, the mounting portion of the upper collar member 102 functions as an enlarged diameter portion having an increased strength in the upper rod 86.

A portion (first enlarged diameter portion) of the upper rod 86 to which the upper collar member 102 is attached is inserted into a second rod hole 120a of a first stopper (first guide portion) 110 described later.

When the cam plate 84 rotates together with the opening/closing lever 82, the upper rod 86 moves along the up-down direction (the directions of the arrows B1 and B2). In the locked state in which the opening operation of the opening/closing door 72 illustrated in FIGS. 6A to 7A is restricted, the first connecting portion 94 and the upper rod 86 are disposed substantially in a straight line. The upper end 86a of the upper rod 86 is located rearward (in the direction of the arrow C2) of the first wall portion 38 of the first front frame piece 36. The upper end 86a of the upper rod 86 is disposed upward (in the direction of arrow B1) of the lower end of the first wall portion 38.

In the unlocked state in which the restriction on the opening operation of the opening/closing door 72 shown in FIGS. 8A to 9A is released, the first connecting portion 94 is inclined at a predetermined angle from the up-down direction. As the first connecting portion 94 is displaced, the upper rod 86 is pulled downward (in the direction of the arrow B2) and lowered. The upper end 86a of the upper rod 86 is positioned on the lower side (in the direction of arrow B2) of the lower end of the first wall portion 38.

Similarly to the upper rod 86, the lower rod 88 is a shaft body having a constant diameter and made of a metal material. The lower rod 88 is disposed below the center of the opening/closing door 72 in the height direction (in the direction of the arrow B2) and extends along the up-down direction. The lower rod 88 is arranged coaxially with the upper rod 86. An upper end of the lower rod 88 is bent substantially at a right angle toward a side opposite to the opening/closing door 72. In other words, the upper end of the lower rod 88 is bent rearward (in the direction of the arrow C2) substantially at a right angle. The upper end of the lower rod 88 is inserted into the support hole 100 of the second connecting portion 96 of the cam plate 84 (see FIG. 4).

As illustrated in FIGS. 4, 6A, 6B, 7B, 8A, 8B, 9A, and 9B, the lower rod 88 is inserted into a first rod hole 118b of a second slider 108, which will be described later, disposed on an inner surface of the opening/closing door 72. Accordingly, the lower rod 88 is supported by the opening/closing door 72 so as to be movable in the up-down direction (the direction of the arrows B1 and B2).

A lower end (axially lower end) 88a of the lower rod 88 is covered with a second cap member 103. The second cap member 103 has a bottomed tubular shape having a bottom portion on the lower side (in the arrow B2 direction). The second cap member 103 is formed of an elastic material such as rubber or resin. A lower collar member (second enlarged diameter portion) 104 is mounted in the vicinity of the lower end 88a of the lower rod 88. The lower collar member 104 covers the outer peripheral surface of the lower end 88a.

The lower collar member 104 has a predetermined length along the axial direction of the lower rod 88 (the directions of the arrows B1 and B2). The lower collar member 104 is fixed at a position spaced upward from the lower end 88a (in the direction of the arrow B1) by a predetermined distance. The lower collar member 104 is fixed to the lower end 88a of the lower rod 88 by welding or the like, for example.

The axial distance between the lower end of the lower collar member 104 and the lower end 88a of the lower rod 88 is the same as the axial distance from the upper end 86a of the upper rod 86 to the upper end of the upper collar member 102. That is, in the vicinity of the lower end 88a of the lower rod 88, the shaft diameter of the lower rod 88 is increased by mounting the lower collar member 104. Therefore, the mounting portion of the lower collar member 104 functions as an enlarged diameter portion having an increased strength in the lower rod 88.

The lower rod 88 has a mounting portion to which the lower collar member 104 is mounted. This mounting portion is inserted into a second rod hole 120b of a second stopper (second guide portion) 112 described later. In the locked state in which the opening/closing door 72 is closed as shown in FIG. 4 and FIGS. 6A to 7B, the axial distance L2 from the second stopper 112 to the upper end of the lower collar member 104 is set larger than the axial distance L1 from the first stopper 110 to the lower end of the upper collar member 102 (L2>L1).

Accordingly, when the cam plate 84 rotates together with the opening/closing lever 82, the lower rod 88 moves along the up-down direction (the direction of the arrows B1 and B2). In the locked state in which the opening operation of the opening/closing door 72 illustrated in FIGS. 6A to 7B is restricted, the second connecting portion 96 and the lower rod 88 are disposed substantially in a straight line. The lower end 88a of the lower rod 88 is disposed rearward (in the arrow C2 direction) of the second wall portion 46 of the second front frame piece 44. The lower end 88a of the lower rod 88 is positioned below (in the direction of arrow B2) the upper end of the second wall portion 46.

As shown in FIGS. 8A to 9B, in the unlocked state in which the restriction on the opening operation of the opening/closing door 72 is released, the second connecting portion 96 is inclined at a predetermined angle from the up-down direction. As the second connecting portion 96 is displaced, the lower rod 88 is pulled upward (in the direction of the arrow B1) and rises. The lower end 88a of the lower rod 88 is positioned above (in the arrow B1 direction) the upper end of the second wall portion 46.

The support mechanism 80 includes the first slider 106, the second slider 108, the first stopper 110, and the second stopper 112, as shown in FIGS. 4, and 6A to 9B. The support mechanism 80 is disposed on an inner surface of the opening/closing door 72 in the vicinity of the center in the width direction. The first slider 106 supports the upper rod 86 so as to be movable in the up-down direction (the direction of arrows B1 and B2). The second slider 108 supports the lower rod 88 so as to be movable in the up-down direction. The first stopper 110 is disposed above the first slider 106. The upper rod 86 is inserted through the first stopper 110. The second stopper 112 is disposed below the second slider 108. The lower rod 88 is inserted through the second stopper 112.

The first slider 106 and the second slider 108 have substantially the same shape. The first slider 106 and the second slider 108 protrude rearward (in the direction of the arrow C2) from the inner surface of the opening/closing door 72. The first slider 106 and the second slider 108 protrude from the inner surface of the opening/closing door 72 in a direction orthogonal to the inner surface. The first slider 106 is disposed near the upper end of the opening/closing door 72. The second slider 108 is disposed near the lower end of the opening/closing door 72. Specifically, the first slider 106 and the second slider 108 are disposed symmetrically with respect to the height-direction center of the opening/closing door 72. The first rod hole 118a is provided in the vicinity of the rear end of the first slider 106.

The upper rod 86 is inserted through the first rod hole 118a. The upper rod 86 is guided by the first rod hole 118a of the first slider 106 so as to be movable in the up-down direction (the direction of arrows B1 and B2).

The first rod hole 118b is provided in the vicinity of the rear end of the second slider 108. The lower rod 88 is inserted through the first rod hole 118b. The lower rod 88 is guided by the first rod hole 118b of the second slider 108 so as to be movable in the up-down direction (the direction of the arrows B1 and B2).

The first stopper 110 and the second stopper 112 have substantially the same shape. Similarly to the first slider 106, the first stopper 110 protrudes rearward (in the direction of the arrow C2) from the inner surface of the opening/closing door 72. The first stopper 110 is separated from the first slider 106 by a predetermined distance upward (in the direction of the arrow B1). The first stopper 110 is substantially parallel to the first slider 106. Similarly to the second slider 108, the second stopper 112 protrudes rearward (in the direction of the arrow C2) from the inner surface of the opening/closing door 72. The second stopper 112 is spaced apart from the second slider 108 by a predetermined distance downward (in the direction of the arrow B2). The second stopper 112 is substantially parallel to the second slider 108.

The second rod hole 120a is provided in the vicinity of the rear end of the first stopper 110. The second rod hole 120a is coaxial with the first rod hole 118a of the first slider 106. The second rod hole 120b is provided near the rear end of the second stopper 112. The second rod hole 120b is arranged coaxially with the first rod hole 118b of the second slider 108. The second rod holes 120a, 120b are larger in diameter than the first rod holes 118a, 118b, respectively. Accordingly, the upper collar member 102 and the lower collar member 104 can be inserted into the second rod holes 120a and 120b, respectively. When the opening/closing door 72 is opened, the upper rod 86 passed through the second rod hole 120a can tilt, and the lower rod 88 passed through the second rod hole 120b can tilt.

In a locked state in which the opening operation of the opening/closing door 72 is locked by the opening/closing switching mechanism 78, the upper end 86a of the upper rod 86 is disposed behind the first front frame piece 36. In the locked state, the first cap member 101 is in sliding contact with the first wall portion 38. In the locked state, the lower end 88a of the lower rod 88 is disposed behind the second front frame piece 44. In the locked state, the second cap member 103 is in sliding contact with the second wall portion 46. Note that the first cap member 101 protrudes slightly downward (in the direction of the arrow B2) from the lower end of the first wall portion 38. The second cap member 103 protrudes slightly upward (in the direction of arrow B1) from the upper end of the second wall portion 46.

As shown in FIG. 3, the water electrolysis system 14 includes a water electrolysis unit 122, a storage unit 124, a supply unit 126, and an electrical unit 128.

The water electrolysis unit 122 and the electrical unit 128 are disposed forward (in the direction of the arrow C1) inside the housing 12. The supply unit 126 and the storage unit 124 are accommodated rearward (in the direction of the arrow C2) inside the housing 12. The electrical unit 128 is disposed at an upper portion of the housing 12 on one side in the width direction (arrow A1 direction). The water electrolysis unit 122 is disposed on the other side in the width direction of the housing 12 (the direction of the arrow A2). The electrical unit 128 controls operation of the supply unit 126 and the water electrolysis unit 122.

Next, the operation and effects of the hydrogen production apparatus 10 will be described.

First, a circulation pump (not shown) constituting the water electrolysis unit 122 is driven. When the circulation pump is driven, water (pure water) is supplied to a water electrolysis stack (not shown). Water is electrolyzed in the water electrolysis stack to which a voltage is applied. Thus, hydrogen gas is obtained in the water electrolysis stack. After moisture (water) is removed, the hydrogen gas is sent to the storage unit 124 and stored therein. The hydrogen gas is supplied from the storage unit 124 to an external device (for example, a fuel cell electric vehicle) (not shown) through the supply unit 126 as necessary.

Next, a case where the opening/closing door 72 of the above-described hydrogen production apparatus 10 is opened and closed will be described.

First, in the hydrogen production apparatus 10, the grip portion 92 of the opening/closing lever 82 illustrated in FIGS. 2, 4, and 6A to 7B extends in the up-down direction (the direction of the arrows B1 and B2), so that the opening/closing door 72 is in a locked state. In the locked state of the opening/closing door 72, the opening/closing switching mechanism 78 and the support mechanism 80 are in the following states. The first and second connecting portions 94, 96 of the cam plate 84 are arranged in a straight line along the up-down direction. The upper end 86a of the upper rod 86 is disposed behind (in the direction of the arrow C2) the first wall portion 38 of the first front frame piece 36. The lower end 88a of the lower rod 88 is disposed behind (in the direction of the arrow C2) the second wall portion 46 of the second front frame piece 44. The upper collar member 102 is inserted into the second rod hole 120a of the first stopper 110. The lower collar member 104 is inserted into the second rod hole 120b of the second stopper 112.

In this way, the upper end 86a of the upper rod 86 is disposed on the rear side (the arrow C2 direction) of the first front frame piece 36, and the first cap member 101 is in sliding contact with the first wall portion 38. The lower end 88a of the lower rod 88 is disposed rearward (in the direction of the arrow C2) of the second front frame piece 44, and the second cap member 103 is in sliding contact with the second wall portion 46. As a result, movement of the opening/closing door 72 toward the front (in the direction of the arrow C1) is restricted, and the opening/closing door 72 is placed in a locked state (opening operation restricted state). The opening operation of the opening/closing door 72 is restricted with the opening/closing door 72 closing the front end 70 of the housing 12, and the opening/closing door 72 does not open.

In a state where the opening/closing door 72 is closed and locked, airtightness inside of the housing 12 is ensured.

Next, when the opening/closing door 72 is opened from the housing 12, an operator (not shown) grips the grip portions 92 of the pair of opening/closing levers 82. For example, the opening/closing levers 82 rotate the lower ends of the grip portions 92 in directions away from each other, that is, toward the outer sides in the width direction with the shaft portions 90 as fulcrums.

As a result, as shown in FIGS. 8A and 8B, each of the cam plates 84 rotates by a predetermined angle together with the shaft portion 90 inside the opening/closing door 72. As the cam plate 84 rotates, the first and second connecting portions 94, 96 of the cam plate 84 are inclined by a predetermined angle from the up-down direction. As the cam plate 84 rotates, the lower end of the upper rod 86 inserted into the support hole 98 is pulled downward (in the direction of the arrow B2). As the cam plate 84 rotates, the lower end 88a of the lower rod 88 inserted into the support hole 100 is pulled upward (in the direction of the arrow B1). Specifically, the second connecting portions 96 of the pair of cam plates 84 approach each other. The pair of first connecting portions 94 are disposed to be separated away from each other. Thus, the upper rod 86 and the lower rod 88 move in directions to approach each other due to the rotation of the cam plate 84. Each of the upper rod 86 and the lower rod 88 is inclined by a predetermined angle with respect to the up-down direction (directions of arrows B1 and B2).

As a result, the upper rod 86 is inclined with respect to the up-down direction, and thus moves downward along the first rod hole 118a of the first slider 106. The upper collar member 102 tilts in the width direction in the second rod hole 120a of the first stopper 110. The upper end 86a of the upper rod 86 is disposed below (in the direction of arrow B2) the lower end of the first front frame piece 36 together with the first cap member 101 (see FIG. 8B).

The lower rod 88 is inclined with respect to the up-down direction, and then moves upward along the first rod hole 118b of the second slider 108. The lower collar member 104 tilts in the width direction in the second rod hole 120b of the second stopper 112. The lower end 88a of the lower rod 88 is disposed above (in the direction of the arrow B1) the upper end of the second front frame piece 44 together with the second cap member 103 (see FIG. 8B).

As a result, the engagement between the upper rod 86 and the first front frame piece 36 is released. The engagement between the lower rod 88 and the second front frame piece 44 is released. The opening/closing door 72 having the opening/closing switching mechanism 78 can be opened forward (in the direction of the arrow C1). An operator (not shown) pulls the opening/closing levers 82 forward (in the direction of the arrow C1) while holding the opening/closing levers 82. As a result, the pair of door bodies 74a and 74b laterally open in the left-right direction (directions of arrows A1 and A2) with the left and right support shafts 76 serving as fulcrums (see a two-dot dashed line shape in FIG. 1).

When the opening/closing door 72 is closed again, an operator (not shown) grips the opening/closing levers 82 and rotates the pair of door bodies 74a and 74b. After the front end 70 of the housing 12 is closed by the opening/closing door 72, the opening/closing levers 82 are rotated in directions in which the lower ends of the opening/closing levers 82 approach each other. The cam plates 84 rotate with the rotation of the opening/closing levers 82. Since each opening/closing lever 82 is disposed along the up-down direction, the first and second connecting portions 94, 96 of the cam plate 84 are aligned in a straight line in the up-down direction. As the first connecting portion 94 is displaced, the upper end 86a of the upper rod 86 moves upward, and the upper end 86a moves to the rear of the first wall portion 38 of the first front frame piece 36. Along with the displacement of the second connecting portion 96, the lower end 88a of the lower rod 88 moves downward, and the lower end 88a moves to the rear of the second wall portion 46 of the second front frame piece 44.

As a result, the upper end 86a of the upper rod 86 is engaged with the first front frame piece 36, and movement of the upper rod 86 toward the front (the direction of the arrow C1) is restricted. The lower end 88a of the lower rod 88 is engaged with the second front frame piece 44, and movement of the lower rod 88 toward the front (the direction of the arrow C1) is restricted. As a result, movement of the opening/closing door 72 from the front end 70 toward the front (in the direction of the arrow C1) is restricted by the opening/closing switching mechanism 78. That is, a locked state in which opening and closing of the opening/closing door 72 is restricted is brought about.

In the hydrogen production apparatus 10 shown in FIG. 1, when the front end 70 of the housing 12 is closed by the opening/closing door 72, hydrogen gas produced in the water electrolysis unit 122 may leak into the housing 12 and accumulate therein for some reason, for example. Next, a case where hydrogen gas is ignited by sparks, static electricity, or the like generated in the electrical unit 128 and an explosion occurs will be described with reference to FIGS. 9A to 11B.

First, when the hydrogen gas accumulated in the housing 12 explodes, the internal pressure of the housing 12 rapidly increases due to the explosion. An excessive pressure is applied to the side panels 18a and 18b, the rear panel 20, the ceiling panel 24, and the opening/closing door 72 constituting the housing 12 so as to press them from the inside toward the outside. At this time, part of the pressure is released to the outside through the ventilation opening 56 opened in the ceiling panel 24. The ceiling panel 24 is pressed upward by the pressure (in the direction of the arrow B1).

As shown in FIG. 3, the fixing strength of the second panel body 54 of the ceiling panel 24 is lower than the fixing strength of the first panel body 52. Therefore, the fixed state of the second panel body 54 to the frame 16 by the three rivets 62 is released by the application of pressure. The second panel body 54 is pushed upward and detached from the housing 12 (see a two-dot chain line shape in FIG. 3). Thus, the upper portion of the housing 12 opens.

Specifically, as shown in FIG. 3, the other end of the second panel body 54 in the width direction fixed by one rivet 62 comes off the frame 16 before the one end of the second panel body 54 in the width direction fixed by two rivets 62 comes off. At this time, one end of the second panel body 54 in the width direction remains fixed to the frame 16. As a result, part of the pressure inside the housing 12 is released to the outside from the upper portion of the housing 12 through the ventilation opening 56, and is also released to the outside from the upper portion of the housing 12 that is opened by part of the second panel body 54 being detached.

The center and its vicinity of the opening/closing door 72 in the height direction are pressed outward (forward) by the pressure remaining in the housing 12. The cam plate 84 of the opening/closing switching mechanism 78, the lower end of the upper rod 86 supported by the cam plate 84, and the upper end of the lower rod 88 supported by the cam plate move forward (in the direction of the arrow C1) together with the opening/closing door 72. Along with the forward movement of the opening/closing door 72, the first and second sliders 106, 108 and the first and second stoppers 110, 112 also move integrally forward (in the direction of the arrow C1).

Figure 11A:
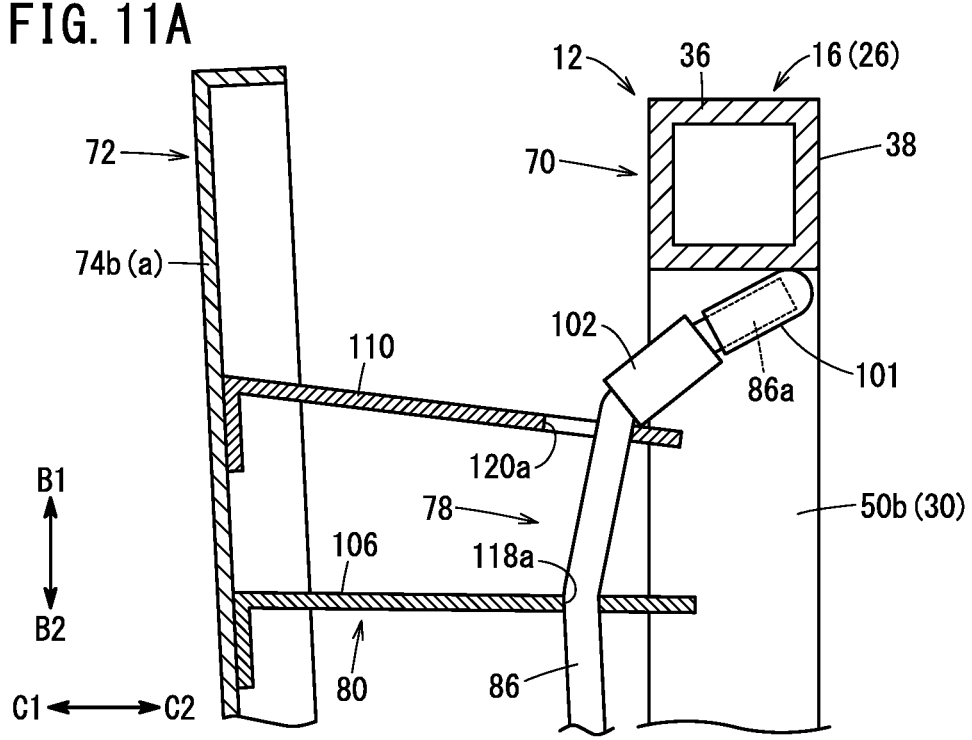
FIG. 11A is an enlarged cross-sectional view showing an upper rod and its vicinity of the opening/closing switching mechanism in FIG. 10.

As a result, as shown in FIG. 11A, the upper end 86a of the upper rod 86 is engaged with the first front frame piece 36. The upper rod 86 moves forward while being inserted into the first rod hole 118a of the first slider 106. As a result, the upper rod 86 is deformed and inclined at a predetermined angle. The upper collar member 102 is pulled out upward (in the direction of arrow B1) from the second rod hole 120a of the first stopper 110. The upper end 86a of the upper rod 86 is further bent rearward (in the direction of the arrow C2) from the lower end of the upper collar member 102. As a result, along with the deformation of the upper rod 86, the upper end 86a of the upper rod 86 bends backward and moves under the lower end of the first wall portion 38 of the first front frame piece 36. The upper end 86a moves toward the front of the housing 12 (in the direction of the arrow C1).

Figure 11B:
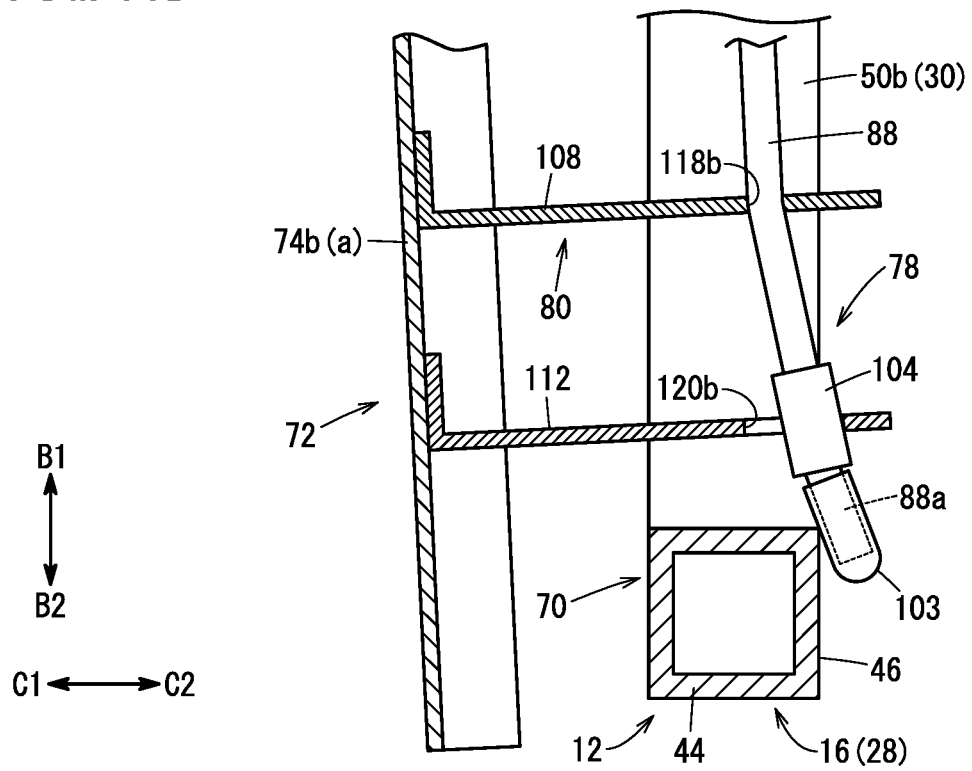
FIG. 11B is an enlarged cross-sectional view showing a lower rod and its vicinity of the opening/closing switching mechanism in FIG. 10.
Figure 12A:
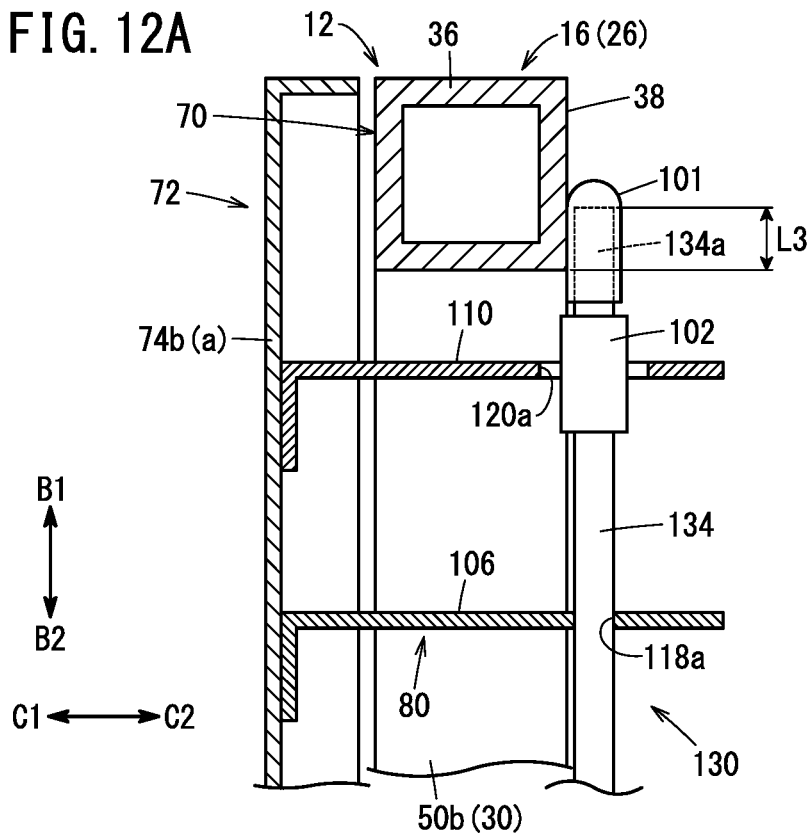
FIG. 12A is an enlarged cross-sectional view of an upper rod and its vicinity in an opening/closing switching mechanism according to a modification.
Figure 12B:
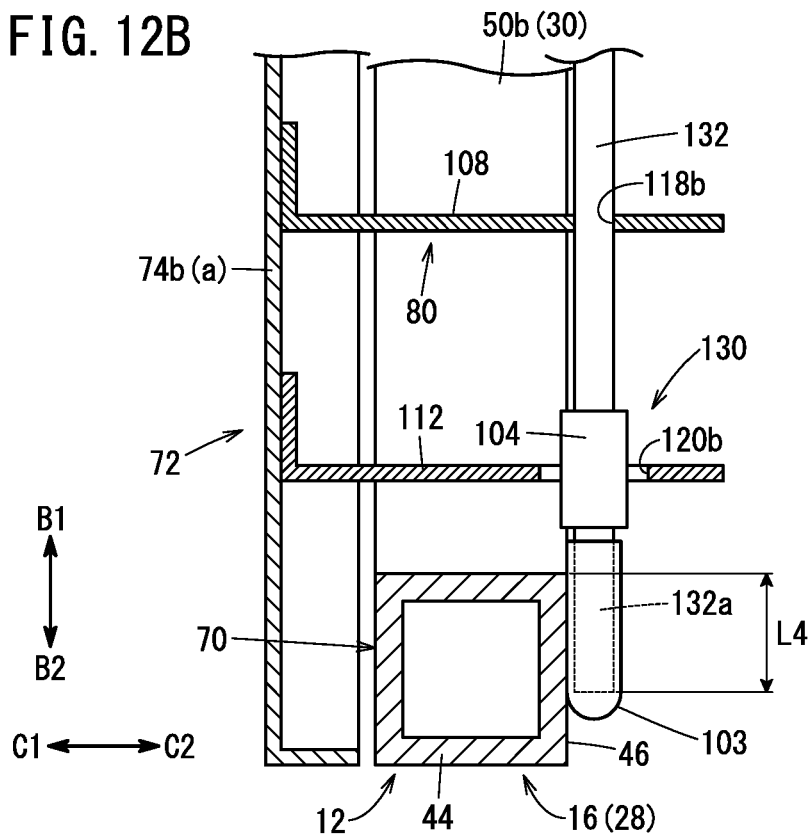
FIG. 12B is an enlarged cross-sectional view of a lower rod and its vicinity in the opening/closing switching mechanism.
Figure 13A:
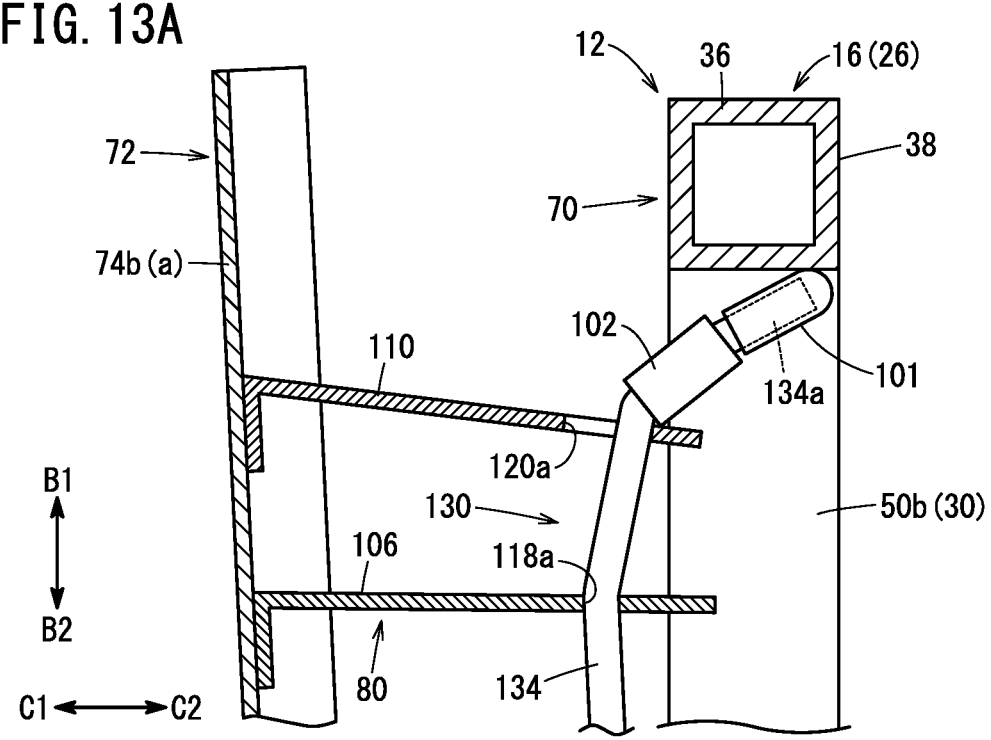
FIG. 13A is an enlarged cross-sectional view showing the upper rod and its vicinity when an excessive pressure occurs inside the hydrogen production apparatus having the opening/closing switching mechanism of FIG. 12A.
Figure 13B:
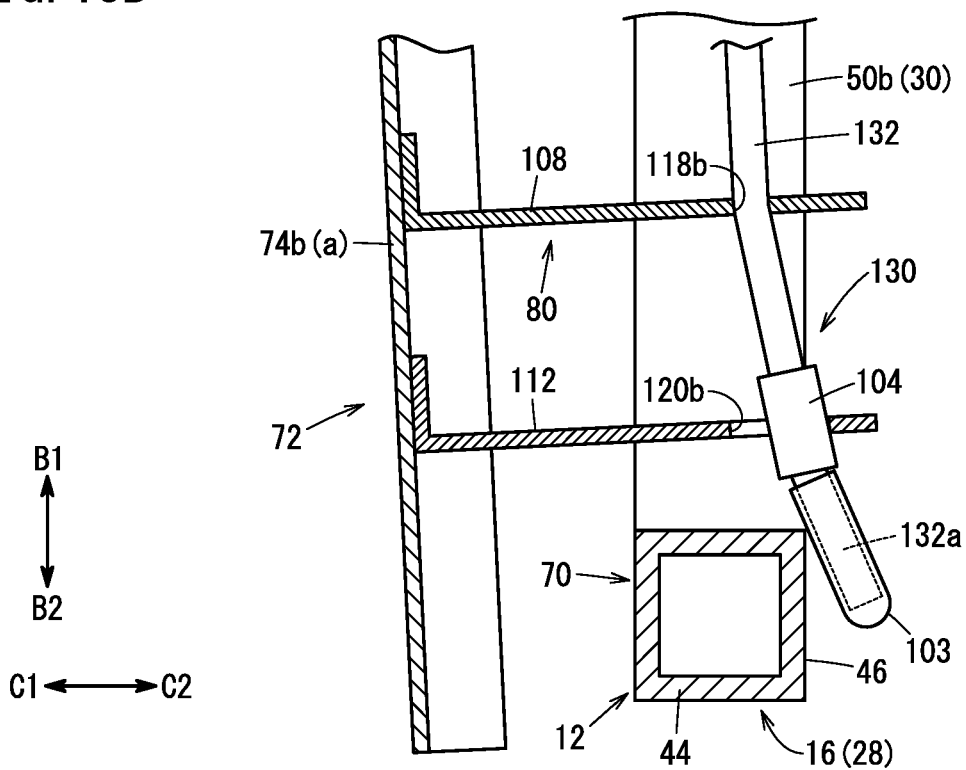
FIG. 13B is an enlarged cross-sectional view showing the lower rod and its vicinity when an excessive pressure occurs inside the hydrogen production apparatus.

As shown in FIG. 11B, the lower end 88a of the lower rod 88 is engaged with the second front frame piece 44. The lower rod 88 moves forward while being inserted into the first rod hole 118b of the second slider 108. As a result, the lower rod 88 is deformed and inclined at a predetermined angle. When the upper rod 86 and the lower rod 88 are not deformed, the axial distance L2 from the second stopper 112 to the upper end of the lower collar member 104 is greater than the axial distance L1 from the first stopper 110 to the lower end of the upper collar member 102 (see FIG. 7A and FIG. 7B). Therefore, when the lower rod 88 is deformed as illustrated in FIG. 11B, the lower collar member 104 does not come off the second rod hole 120b of the second stopper 112. The lower collar member 104 remains inserted into the second rod hole 120b.

Therefore, a portion of the lower rod 88 (second enlarged diameter portion) to which the lower collar member 104 is attached and having high strength is suitably held by the second stopper 112 (second rod hole 120b). Therefore, the lower rod 88 is not largely bent unlike the upper rod 86. The lower end 88a of the lower rod 88 does not climb over the second wall portion 46 of the second front frame piece 44. Therefore, the lower end 88a of the lower rod 88 is maintained in a state of being engaged with the rear side (the arrow C2 direction) of the second front frame piece 44. The lower end 88a of the lower rod 88 remains restricted from moving toward the front of the housing 12 (in the direction of the arrow C1).

As a result, the engagement of the upper rod 86 with the first front frame piece 36 (the first wall portion 38) is released at the upper portion of the housing 12 (in the direction of the arrow B1) when the housing is pressed from the inside to the outside with an excessive pressure accompanying an explosion occurring inside the housing 12. On the other hand, the engagement of the lower rod 88 with the second front frame piece 44 (the second wall portion 46) is not released at the lower portion of the housing 12 (in the arrow B2 direction). That is, the engagement between the second front frame piece 44 and the lower rod 88 is maintained. Therefore, as shown in FIG. 10, the upper part of the opening/closing door 72 is slightly opened by moving outward (forward) from the front end 70 of the housing 12 and thereby opening. In the lower part of the opening/closing door 72, the front end 70 of the housing 12 is kept closed. In other words, when viewed from the width direction of the hydrogen production apparatus 10 shown in FIG. 10, a portion of the opening/closing door 72 that lies above the center in the height direction (in the direction of the arrow B1) is deformed so as to be inclined forward. As a result, a gap (opening) is formed between the opening/closing door 72 and the housing 12.

As a result, the pressure remaining inside the housing 12 is released to the outside through the opening portion opened between the upper part of the opening/closing door 72 and the housing 12. As a result, the pressure in the housing 12 decreases.

As described above, even in a case where an explosion occurs due to ignition caused by leakage of hydrogen gas in the housing 12, an excessive pressure that rapidly rises thereinside can be released to the outside through the ventilation opening 56 opened in the ceiling panel 24. The application of pressure causes the second panel body 54 of the ceiling panel 24 to separate from the frame 16. Thus, the upper portion of the housing 12 is opened to thereby release the pressure to the outside. When an excessive pressure is applied to the opening/closing door 72, the opening operation restricted state of the opening/closing door 72 by the upper rod 86 of the opening/closing switching mechanism 78 is released. Thus, only the upper part of the opening/closing door 72 is opened and the pressure can be released to the outside.

As described above, in this embodiment, in the hydrogen production apparatus 10 in which the opening/closing door 72 is closed, even when hydrogen gas explodes in the housing 12, the upper rod 86 and the lower rod 88 of the opening/closing switching mechanism 78 are pushed outward (forward) together with the opening/closing door 72 and the cam plate 84 due to a rapidly increased pressure. With the movement of the opening/closing switching mechanism 78, the upper collar member 102 attached to the upper rod 86 is separated from the first stopper 110 and deformed. The lower collar member 104 mounted near the lower end 88a of the lower rod 88 remains held by the second stopper 112.

Therefore, in a locked state in which the opening operation of the opening/closing door 72 is restricted by the opening/closing switching mechanism 78, the upper end 86a of the upper rod 86 can bent backward, and move forward under the lower end of the first front frame piece 36. Accordingly, the upper portion of the opening/closing door 72 can be opened from the housing 12, and the front end 70 of the housing 12 can be opened.

As a result, even when an excessive pressure is generated inside the hydrogen production apparatus 10, the upper part of the opening/closing door 72 is opened before the lower part of the opening/closing door 72 opens. Thus, the pressure can be released to the outside from the opened portion between the opening/closing door 72 and the housing 12. Therefore, damage or the like to the water electrolysis system 14 inside the housing 12 due to pressure can be reduced. For example, even if a person is present around the opening/closing door 72 when an explosion occurs, the opening/closing door 72 is not fully opened. The opening/closing door 72 does not come off the frame 16. Therefore, contact between the opening/closing door 72 and a person can be surely avoided to protect the person.

The upper part of the opening/closing door 72 is opened to thereby reduce the pressure in the housing 12. Thus, it is possible to prevent the side panels 18a, 18b, the rear panel 20, or the like constituting the housing 12 from coming off and flying off by the pressure.

The ceiling panel 24 is made up of the first and second panel bodies 52, 54 which can be divided in the width direction (arrow A1, A2 direction). The first panel body 52 is arranged on one side in the width direction (arrow A1 direction) of the ceiling panel 24. The first panel body 52 is secured to the frame 16 with a plurality of fastening screws 55. The second panel body 54 is arranged on the other side in the width direction of the ceiling panel 24. The second panel body 54 is adjacent to the first panel body 52. The second panel body 54 is fixed to the frame 16 by rivets 62. Accordingly, the fixing strength of the second panel body 54 to the frame 16 is lower than the fixing strength of the first panel body 52 to the frame 16.

As a result, when the pressure in the housing 12 rapidly increases due to the explosion and the ceiling panel 24 is pushed up to the outside by the pressure, the second panel body 54 having lower fixing strength comes off the frame 16 upward before the first panel body 52 comes off. Therefore, only the second panel body 54 can be detached from the frame 16 without the entire ceiling panel 24 coming off the frame 16. In other words, since the fixing strength of the first panel body 52 and the fixing strength of the second panel body 54 are different from each other, it is possible to control the opening portion of the ceiling panel 24 at the time of explosion.

The ceiling panel 24 includes a ventilation opening 56. The ventilation opening 56 opens at a position facing the water electrolysis unit 122. Therefore, even when the hydrogen gas leaked inside the housing 12 is ignited and exploded, the internal pressure that rapidly increases inside the housing 12 can be suitably released to the outside by using the ventilation opening 56. As a result, the rapid pressure increase in the housing 12 can be suppressed.

The fixing strength of the ceiling panel 24 to the housing 12 is lower than the fixing strength of the opening/closing door 72 to the housing 12. Thus, when the internal pressure of the housing 12 increases due to explosion, the ceiling panel 24 comes off the housing 12 before the opening/closing door 72 comes off the housing 12. As a result, the internal pressure can be released to the outside from the portion of the housing 12 from which the ceiling panel 24 has been detached. Therefore, when an explosion occurs, deformation of the opening/closing door 72 and flying-off of the opening/closing door 72 can be suppressed. For example, even when a person is present around the opening/closing door 72, it is possible to preferably avoid contact between the opening/closing door 72 and the person.

The upper end 86a of the upper rod 86 is covered with the first cap member 101 made of an elastic material. The lower end 88a of the lower rod 88 is covered with the second cap member 103 made of an elastic material. Therefore, in the locked state in which the opening operation of the opening/closing door 72 is restricted, contact sound and impact generated when the upper end 86a contacts the first front frame piece 36 can be suitably alleviated by the first cap member 101. Contact sound and impact generated when the lower end 88a contacts the second front frame piece 44 can be suitably alleviated by the second cap member 103.

In the opening/closing switching mechanism 78 of the hydrogen production apparatus 10, in the locked state in which the opening operation of the closed opening/closing door 72 is restricted, the axial distance L2 from the second stopper 112 to the upper end of the lower collar member 104 is larger than the axial distance L1 from the first stopper 110 to the lower end of the upper collar member 102 (L2>L1). However, the present invention is not limited to this configuration.

For example, the opening/closing switching mechanism 130 according to a modification shown in FIGS. 12A to 13B may be employed. In the opening/closing switching mechanism 130, an axial distance (axial lap length) L4 from the upper end of the second front frame piece 44 to the lower end 132a of the lower rod 132 is larger than an axial distance (axial lap length) L3 from the lower end of the first front frame piece 36 to the upper end 134a of the upper rod 134 (L3<L4).

In order to realize the above-described configuration, the axial length of the upper rod 134 and the axial length of the lower rod 132 may be different from each other. The relative positional relationship between the upper rod 134 and the lower end position of the first front frame piece 36 and the relative positional relationship between the lower rod 132 and the upper end position of the second front frame piece 44 may be changed.

With the above configuration, the upper end 134a of the upper rod 134 is lowered (in the direction of the arrow B2) and disengaged from the first front frame piece 36 before the lower rod 132 is disengaged even when an explosion occurs due to ignition of hydrogen gas leaked inside the housing 12 in the hydrogen production apparatus 10 and the opening/closing door 72 is consequently pressed outward due to the rapidly increasing pressure. As a result, the state in which the opening operation of the upper part of the opening/closing door 72 is restricted by the upper rod 134 is released. Restriction of the opening operation of the lower part of the opening/closing door 72 by the lower rod 132 can be maintained.

As a result, only the upper part of the opening/closing door 72 can be opened so as to be separated from the front end 70 of the housing 12. Therefore, the pressure inside the housing 12 can be suitably released to the outside. Even when a person is present around the hydrogen production apparatus 10, only the upper part of the opening/closing door 72 can be opened. As a result, contact between the opening/closing door 72 that has been pushed outward and deformed and a person can be suitably avoided and the person can be protected.

That is, the structure is not particularly limited as long as the structure allows the upper rod 134 to be disengaged from the frame 16 constituting the housing 12 before the lower rod 132 is disengaged, and allows the upper part of the opening/closing door 72 to be opened before the lower part thereof is opened, when an excessive pressure is applied to the opening/closing door 72 from the inside of the housing 12 toward the outside.

The present invention is not limited to the above-described embodiment, and various configurations can be adopted therein without departing from the essence and gist of the present invention.

What is claimed is:

1. A hydrogen production apparatus comprising: a water electrolysis unit that electrolyzes water to generate hydrogen gas; a storage unit that stores the hydrogen gas generated in the water electrolysis unit; a supply unit that supplies the hydrogen gas stored in the storage unit, to outside; an electrical unit that controls operation of at least the water electrolysis unit; and a housing that houses the water electrolysis unit, the storage unit, the supply unit, and the electrical unit, wherein:
the housing comprises at least an upper frame disposed on an upper side of the housing in a height direction thereof and a lower frame disposed on a lower side thereof in the height direction, and includes an opening end opened in a lateral direction orthogonal to the height direction; and the housing further includes:
an opening/closing door rotatably supported on the housing and configured to open and close the opening end; and a locking mechanism disposed on the opening/closing door and configured to restrict an opening operation of the opening/closing door with the opening end being closed; and wherein:
the locking mechanism includes first and second rods configured to move along a height direction of the opening/closing door orthogonal to an opening direction of the opening end;

in an opening operation restricted state in which the opening end is closed by the opening/closing door and the opening operation of the opening/closing door is restricted by the locking mechanism, an upper end of the first rod is disposed on an opposite side of the upper frame from the opening/closing door, and a lower end of the second rod is disposed on an opposite side of the lower frame from the opening/closing door;

in the opening operation restricted state, a first enlarged diameter portion formed in a vicinity of the upper end of the first rod and enlarged in diameter radially outwardly is in a state of being inserted into a first guide portion disposed on the opening/closing door and extending in a direction opposite to the opening direction of the opening end, and a second enlarged diameter portion formed in a vicinity of the lower end of the second rod and enlarged in diameter radially outwardly is in a state of being inserted into a second guide portion disposed on the opening/closing door and extending in the direction opposite to the opening direction of the opening end; and an axial distance between an upper end of the second enlarged diameter portion and the second guide portion is larger than an axial distance between a lower end of the first enlarged diameter portion and the first guide portion.

2. The hydrogen production apparatus according to claim 1, wherein
a ceiling plate is attached to an upper surface of the housing orthogonal to the opening direction of the opening end, the ceiling plate includes at least two divided pieces, and a fixing strength of one of the divided pieces to the housing is lower than a fixing strength of another one of the divided pieces to the housing.

3. The hydrogen production apparatus according to claim 2, wherein
the ceiling plate includes an opening that opens at a position facing the water electrolysis unit.

4. The hydrogen production apparatus according to claim 2, wherein
a fixing strength of the ceiling plate to the housing is lower than a fixing strength of the opening/closing door to the housing.

5. The hydrogen production apparatus according to claim 1, wherein the locking mechanism includes:
an operating member disposed outside the opening/closing door and rotatably supported; and
a connecting body disposed inside the opening/closing door and connected to the operating member so as to rotate integrally with the operating member, and
wherein
the connecting body has a first end portion and a second end portion positioned respectively on opposite sides of the connecting body so as to be away from a rotation center of the connecting body, and
a lower end of the first rod is pivotally supported by the first end portion of the connecting body, an upper end of the second rod is pivotally supported by the second end portion of the connecting body, and when the operating member and the connecting body rotate, the first rod and the second rod move in directions in which the first rod and the second rod approach each other or separate from each other.

6. A hydrogen production apparatus comprising: a water electrolysis unit that electrolyzes water to generate hydrogen gas; a storage unit that stores the hydrogen gas generated in the water electrolysis unit; a supply unit that supplies the hydrogen gas stored in the storage unit, to outside; an electrical unit that controls operation of at least the water electrolysis unit; and a housing that houses the water electrolysis unit, the storage unit, the supply unit, and the electrical unit,
wherein:
the housing comprises at least an upper frame disposed on an upper side of the housing in a height direction thereof and a lower frame disposed on a lower side thereof in the height direction, and includes an opening end opened in a lateral direction orthogonal to the height direction; and
the housing further includes:
an opening/closing door rotatably supported on the housing and configured to open and close the opening end; and
a locking mechanism disposed on the opening/closing door and configured to restrict an opening operation of the opening/closing door with the opening end being closed; and
wherein:
the locking mechanism includes a pair of first and second rods disposed so as to be movable along a height direction of the opening/closing door orthogonal to an opening direction of the opening end;
in an opening operation restricted state in which the opening end is closed by the opening/closing door and the opening operation of the opening/closing door is restricted by the locking mechanism, an upper end of the first rod is disposed on an opposite side of the upper frame from the opening/closing door, and a lower end of the second rod is disposed on an opposite side of the lower frame from the opening/closing door; and
an axial lap length over which the lower frame and the second rod overlap each other in an axial direction is larger than an axial lap length over which the upper frame and the first rod overlap each other in the axial direction.

7. The hydrogen production apparatus according to claim 6, wherein
a ceiling plate is attached to an upper surface of the housing orthogonal to the opening direction of the opening end, the ceiling plate includes at least two divided pieces, and a fixing strength of one of the divided pieces to the housing is lower than a fixing strength of another one of the divided pieces to the housing.

8. The hydrogen production apparatus according to claim 7, wherein
the ceiling plate includes an opening that opens at a position facing the water electrolysis unit.

9. The hydrogen production apparatus according to claim 7, wherein
a fixing strength of the ceiling plate to the housing is lower than a fixing strength of the opening/closing door to the housing.

* * * * *